US012595591B2

(12) United States Patent
Goodrich et al.

(10) Patent No.: US 12,595,591 B2
(45) Date of Patent: Apr. 7, 2026

(54) PEPTIDE LIBRARIES HAVING ENHANCED SUBSEQUENCE DIVERSITY AND METHODS FOR USE THEREOF

(71) Applicant: ROCHE SEQUENCING SOLUTIONS, INC., Pleasanton, CA (US)

(72) Inventors: Lauren Goodrich, Madison, WI (US); Victor Lyamichev, Fitchburg, WI (US); Jigar Patel, Verona, WI (US); Richard Pinapati, Pleasanton, CA (US); Eric Sullivan, Pleasanton, CA (US); Todd Richmond, Pleasanton, CA (US)

(73) Assignee: Roche Sequencing Solutions, Inc., Pleasanton, CA (US)

( * ) Notice: Subject to any disclaimer, the term of this patent is extended or adjusted under 35 U.S.C. 154(b) by 1140 days.

(21) Appl. No.: 17/622,479

(22) PCT Filed: Jun. 26, 2020

(86) PCT No.: PCT/US2020/040007

§ 371 (c)(1),
(2) Date: Dec. 23, 2021

(87) PCT Pub. No.: WO2020/264441

PCT Pub. Date: Dec. 30, 2020

(65) Prior Publication Data

US 2022/0243360 A1 Aug. 4, 2022

Related U.S. Application Data

(60) Provisional application No. 62/867,765, filed on Jun. 27, 2019, provisional application No. 62/867,666, filed on Jun. 27, 2019.

(51) Int. Cl.
*C40B 30/04* (2006.01)

(52) U.S. Cl.
CPC .................................... *C40B 30/04* (2013.01)

(58) Field of Classification Search
None
See application file for complete search history.

(56) References Cited

U.S. PATENT DOCUMENTS 5,565,325 A 10/1996 Blake
2006/0153865 A1 7/2006 Maksyutov et al.

FOREIGN PATENT DOCUMENTS

GB 2 500 243 A 9/2013
JP 2006-519160 A 8/2006
JP 2017-504795 A 2/2017
WO WO-2018/065300 A1 4/2018

OTHER PUBLICATIONS

International Search Report on PCT Patent Application No. PCT/US2020/040007 dated Oct. 9, 2020 (15 pages).
Notice of Reasons for Rejection for JP Application No. JP2021-577274 dated Jun. 24, 2024, English translation.

*Primary Examiner* — Christian C Boesen
(74) *Attorney, Agent, or Firm* — Foley & Lardner LLP

(57) ABSTRACT

The present technology provides an approach to designing libraries of peptide sequences for discovery and testing of significantly more motifs than would be otherwise available in a given fixed library format. The technology includes a plurality of x-mers embedded in N-mer peptides sequences, where N and x are integers and where N is greater than x. This approach provides for the representation of multiple unique x-mer peptides in a single N-mer peptide feature.

14 Claims, 10 Drawing Sheets

Specification includes a Sequence Listing.

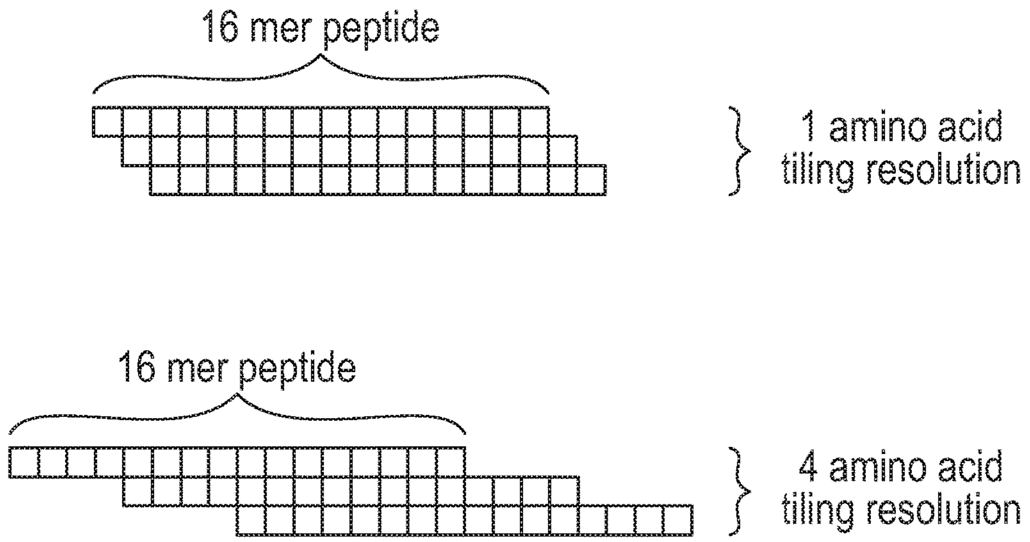

Protein Sequence A: EGVKLTALNDSSLDLSMDSDNSMSV...
(1 amino-acid tiling resolution)

| | Position | Sequence |
|---|---|---|
| Peptide 1 | 1 | EGVKLTALNDSSLDLS |
| Peptide 2 | 2 | GVKLTALNDSSLDLSM |
| Peptide 3 | 3 | VKLTALNDSSLDLSMD |
| Peptide 4 | 4 | KLTALNDSSLDLSMDS |
| Peptide 5 | 5 | LTALNDSSLDLSMDSD |
| Peptide 6 | 6 | TALNDSSLDLSMDSDN |
| Peptide 7 | 7 | ALNDSSLDLSMDSDNS |
| Peptide 8 | 8 | LNDSSLDLSMDSDNSM |
| Peptide 9 | 9 | NDSSLDLSMDSDNSMS |
| Peptide 10 | 10 | DSSLDLSMDSDNSMSV |
| Peptide X | n | - - - - - - - - - - - - - - - - |

FIG. 6

PEPTIDE LIBRARIES HAVING ENHANCED SUBSEQUENCE DIVERSITY AND METHODS FOR USE THEREOF

CROSS-REFERENCE TO RELATED APPLICATIONS

This application is a U.S. National Phase Application under 35 U.S.C. § 371 of International Application No. PCT/US2020/040007, filed on Jun. 26, 2020, which claims the benefit of U.S. patent application Nos. 62/867,765 and 62/867,666, filed on Jun. 27, 2019, the contents of which are incorporated herein by reference in their entireties for any and all purposes.

SEQUENCE LISTING

The instant application contains a Sequence Listing which has been submitted electronically in ASCII format and is hereby incorporated by reference in its entirety. Said ASCII copy, created on Dec. 22, 2021, is named 124009-0253_SL.txt and is 22,166 bytes in size.

BACKGROUND

The disclosure relates, in general, to the design and selection of synthetic peptides for interrogating biomarkers and, more particularly, to peptide libraries having enhanced subsequence diversity and methods for use thereof.

Peptides are biological polymers assembled, in part, through the formation of amide bonds between amino acid monomer units. In general, peptides may be distinguished from their protein counterparts based on factors such as size (e.g., number of monomer units or molecular weight), complexity (e.g., number of peptides, presence of coenzymes, cofactors, or other ligands), and the like. Experimental approaches for the identification of binding motifs, epitopes, mimotopes, disease markers, or the like may successfully employ peptides instead of larger or more complex proteins that may be more difficult to obtain or manipulate. As a result, the study of peptides and the capability to synthesize those peptides are of significant interest in the biological sciences and medicine.

Several methods exist for the synthesis of peptides including both in vivo and in vitro translation systems, as well as organic synthesis routes such as solid phase peptide synthesis. Solid phase peptide synthesis is a technique in which an initial amino acid is linked to a solid surface such as a bead, a microscope slide, or another like surface. Thereafter, subsequent amino acids are added in a step-wise manner to the initial amino acid to form a peptide chain. Because the peptide chain is attached to a solid surface, operations such as wash steps, side chain modifications, cyclization, or other treatment steps may be performed with the peptide chain maintained in a discrete location.

Recent advances in solid phase peptide synthesis have led to automated synthesis platforms for the parallel assembly of millions of unique peptide features in an array on a single surface (e.g., a ~75 mm×25 mm microscope slide). The utility of such peptide arrays is, at least in part, dependent on the ability to simultaneously interrogate a diversity of peptide sequences. While existing approaches can enable the interrogation of millions of different sequences, the number of unique sequences that can be interrogated is inherently limited by the reaction sites, for example, on a single array, bead, chip or another solid support.

SUMMARY

The instant disclosure provides a series of peptide binders to biologically relevant proteins identified by a method that comprise identification of overlapping binding of the target protein to small peptides among a comprehensive population of peptides immobilized on a microarray, then performing one or more rounds of maturation of the isolated core hit peptides, followed by one or more rounds of N-terminal and C-terminal extension of the matured peptides.

In one aspect, the present technology is directed to an engineered peptide library that includes a plurality of peptide features, each of the peptide features including at least one peptide, the at least one peptide comprising a composite region having a defined sequence of amino acids of length N, the composite region representing k different elements, each of the different elements having defined sequence of amino acids of length x; wherein x, N and k are integers, x is less than N, k is at least 2, a total number of different elements represented by the engineered peptide library is $K_{Eng}$, the number of peptide features included in the engineered peptide library is F, and $K_{Eng}$ is greater than F. In some embodiments, k=N−x+1.

In some embodiments, the plurality of peptides represents at least about 90% of a target proteome. The engineered peptide libraries described herein may have enhanced subsequence diversity.

In one aspect, the engineered peptide library may include a plurality of peptide features, each of the peptide features including at least one peptide, the at least one peptide comprising a composite region having a defined sequence of amino acids of length N, the composite region representing k different elements, each of the different elements having defined sequence of amino acids of length x; wherein x, N and k are integers, x is less than N, k is at least 2, a total number of different elements represented by the engineered peptide library is $K_{Eng}$, the number of peptide features included in the engineered peptide library is F, KEng is greater than F, a ration of KEng to F is a measure of subsequence diversity, each of the k different elements within each of the composite regions has a unique sequence relative to each of the other different elements with the same composite region, and the defined sequence of each of the composite regions is selected for maximal subsequence diversity relative to a mean subsequence diversity for a total number of random elements KRnd, the random elements having a sequence of amino acids of length x represented by a random peptide library having F peptide features, each of the peptide features of the random peptide library including at least one random peptide, the at least one random peptide having a random sequence of amino acids of length N.

The present technology also provides an engineered peptide library that includes a plurality of peptide features, each of the peptide features including at least one peptide, the at least one peptide comprising a composite region having a defined sequence of at least 15 amino acids, the composite region representing 10 different elements, each of the different elements having defined sequence of 6 amino acids; wherein a total number of different elements represented by the engineered peptide library is $K_{Eng}$, the number of peptide features included in the engineered peptide library is F, and $K_{Eng}$ is at least 9.5*F.

In another aspect, the present technology is directed to a method for identifying a peptide binder, the method comprising: contacting a first sample with the engineered peptide library described herein, and selecting at least one of the plurality of peptides from the first subset of peptides.

BRIEF DESCRIPTION OF THE DRAWINGS

FIG. 6 is a schematic illustration of 16-mer peptides tiled at either 1 amino acid resolution or 4 amino acid resolution, including a table illustrating tiling of a portion of an example protein sequence EGVKLTALNDSSLDLSMDSDNSMSV (SEQ ID NO: 69) represented with 16-mer peptides tiled at 1 amino acid resolution (SEQ ID NOS 71-80, respectively, in order of appearance).

Like numbers will be used to describe like parts from Figure to Figure throughout the following detailed description.

DETAILED DESCRIPTION

I. Overview

Figure 1:
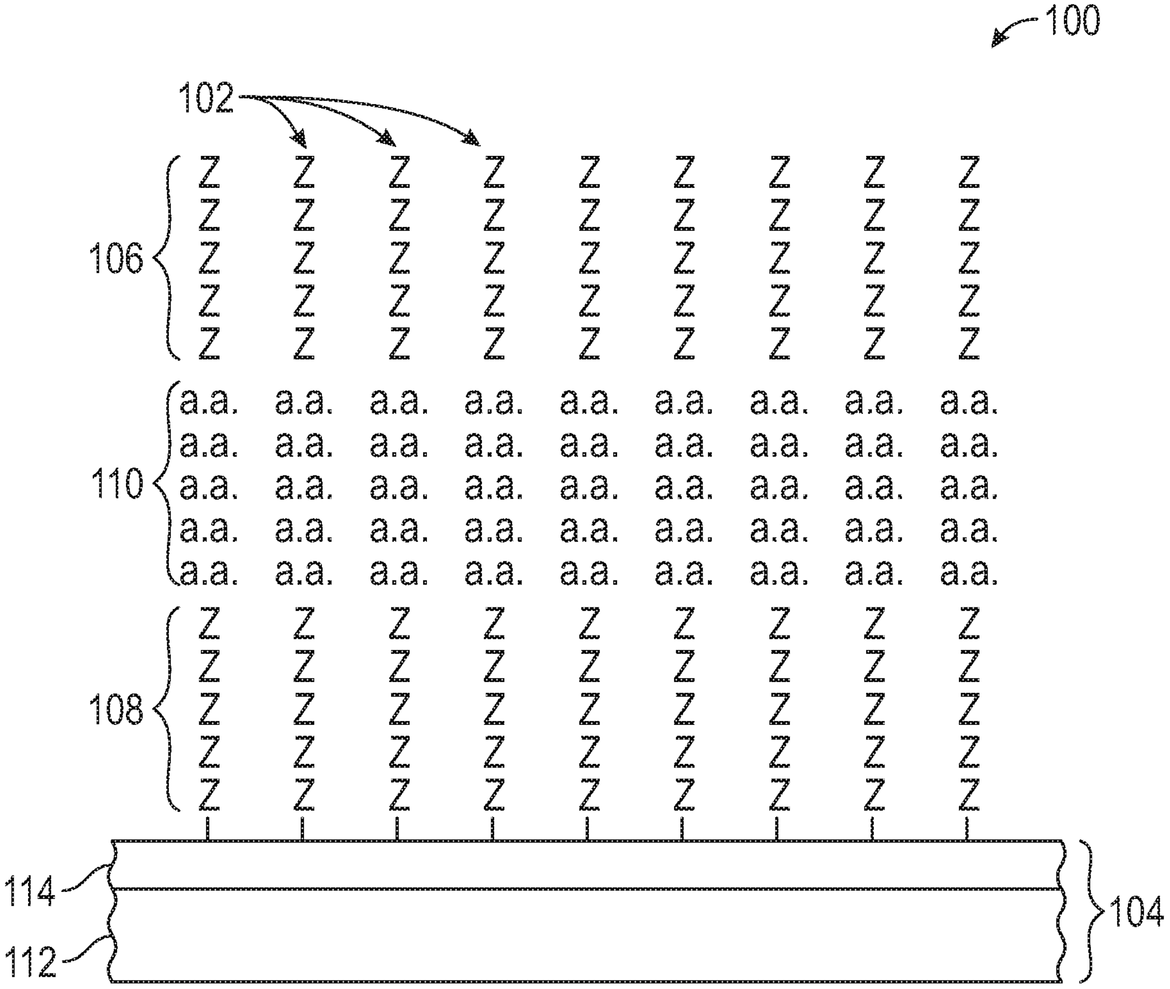
FIG. 1 is a schematic illustration of a peptide array for peptide binder discovery.

As discussed above, in various situations it may be useful to provide a population of peptides prepared by solid phase peptide synthesis. In the case of peptide arrays, the ability to simultaneously interrogate a diversity of peptide sequences is desirable for a variety of applications. While existing approaches can enable the interrogation of millions of different sequences, the number of unique sequences that can be interrogated is inherently limited by the number of available reaction sites or features, for example, on a single array, bead, chip or another solid support. These and other challenges may be overcome with peptide libraries having enhanced subsequence diversity according to the present disclosure.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "engineered peptide library" is a library of peptide sequences designed and synthesized to enable discovery and testing of significantly more motifs than would be otherwise available in a given fixed library format. Libraries of peptides prepared using known synthesis approaches are fixed by parameters including the number of peptides or peptide features (e.g., in the case of a microarray) and the overall length of the peptides in amino acids. However, should it be desirable to screen a larger number of peptides than a given library format provides for, multiple libraries must be created to provide for the requisite library size. For example, a library of all possible 6-mers would require a peptide library size of $20^6$ or about 64 million unique peptides. In an effort to be able to explore a larger portion of this sequence space with a single peptide library, a design approach was developed whereby a plurality of x-mers are embedded in N-mer peptides sequences, where N and x are integers and where N is greater than x. In one aspect, this approach provides for the representation of multiple unique x-mer peptides in a single N-mer peptide feature. In one example, the synthesis of over 30 million unique 6-mer peptide motifs in a ~3 million peptide feature space was achieved. The approach has been validated by screening the aforementioned library against the antibacterial target DsbA.

Consider first an example array having approximately 3 million features available for peptide synthesis. This example array can accommodate the synthesis of up to 3 million unique peptides. As used herein, the term "unique peptides" means that each of the peptides in a fixed population of peptides has a unique amino acid sequence relative to each of the other peptides in the population. For example, two peptides are unique if they differ from one another by at least one amino acid.

Continuing with the above example, considering the use of all 20 canonical amino acids, the number of unique 5 mer peptides that can be prepared is $20^5$, or 3.2 million unique 5-mer peptide sequences. Accordingly, an array having approximately 3 million features can accommodate most if not all possible 5-mer peptides sequences prepared from the 20 canonical amino acid building blocks. Such comprehensive 5-mer peptide have been demonstrated to have utility for identifying peptides binders for a variety of targets (see, e.g., U.S. patent application Ser. No. 15/132,951, entitled Specific Peptide Binders to Proteins Identified via Systematic Discover, Maturation, and Extension Process). However, in certain cases, it may be useful to provide for core binder sequences that are greater than 5 amino acids in length. In such cases, it may be desirable to provide an array of unique 6-, 7-, 8-, 9-, 10-, 11-, 12-, 13-, 14-, 15-, 16-, 17-, 18-, 19-, 20-mer, or longer peptides.

When considering the use of longer peptides, the number of unique amino acid sequences that can be represented on a single array is greatly constrained by the number of available features. In the case of 6-mer peptides prepared from all 20 canonical amino acids, the number of unique 6-mer peptides that can be prepared is $20^6$, or 64 million unique 6-mer peptide sequences. Given the constraint of 3 million features, a single array could maximally represent about 4.7% of all possible unique 6-mer peptide sequences. Alternatively, 22 separate arrays with each array having 3 million unique features would be required to represent all 64 million possible 6-mer sequences. This approach may be feasible under select circumstances; however, the approach becomes infeasible when moving to peptides having a length of 7 amino acids or more.

In one aspect, it may be possible to select a subset of peptides. For example, it may be possible to consider only 6-mer peptide sequences that are present in the human genome; however, it has been shown previously that there are sequences not found in the human genome that are relevant for binder discovery for human targets (see at least Patel A, Dong J C, Trost B, Richardson J S, Tohme S, et al. (2012) Pentamers Not Found in the Universal Proteome Can Enhance Antigen Specific Immune Responses and Adjuvant Vaccines. PLoS ONE 7(8): e43802. doi:10.1371/journal-.pone.0043802). Accordingly, a new approach is needed to increase the representation of unique peptides sequences without the need to increase the feature capacity of a given platform.

Figure 8:
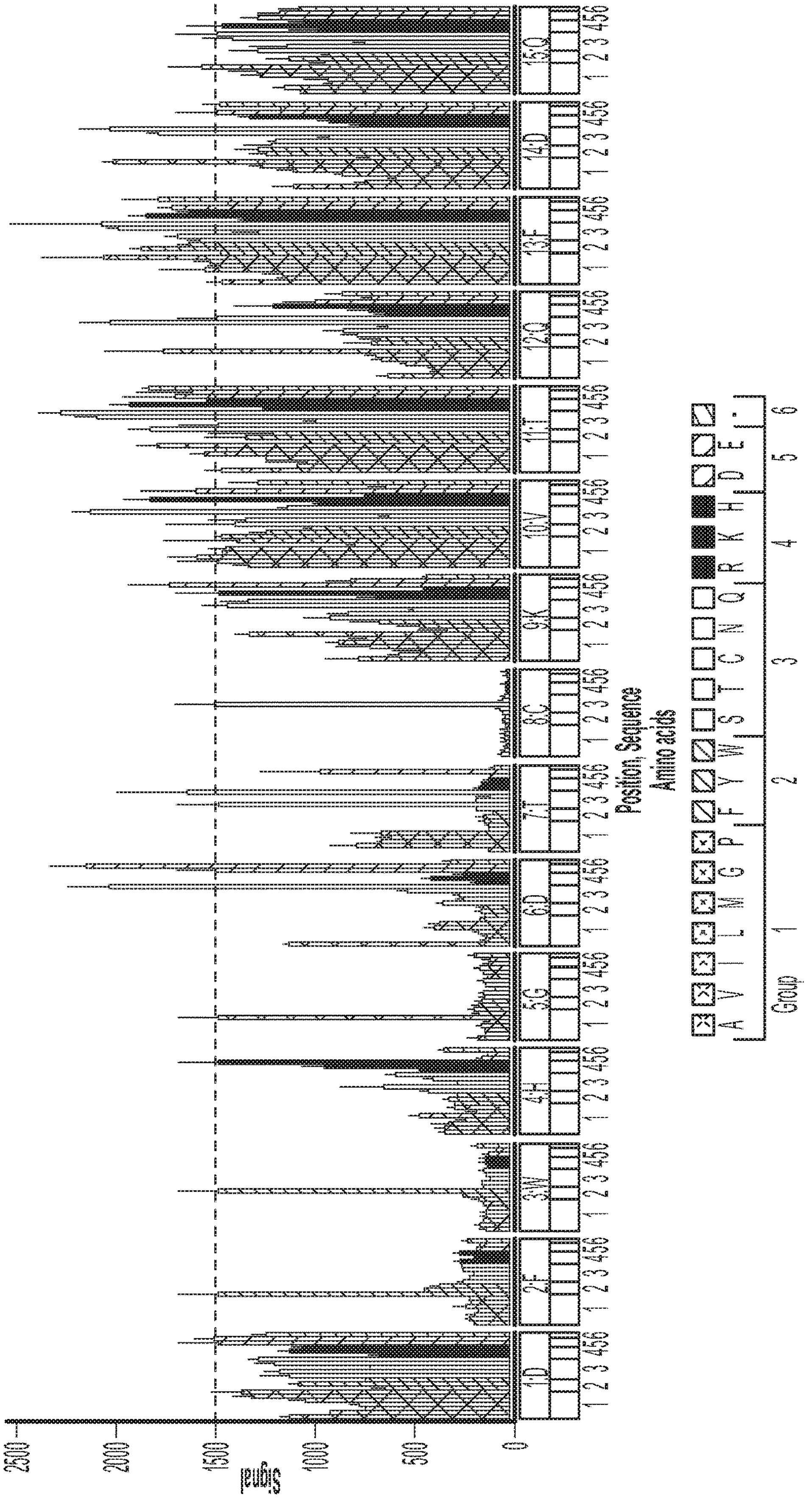
FIG. 8 shows the single substitution plot for the DFWHGDTCKVTQFDQ peptide, DsbA_1_WT (SEQ ID NO: 70). Each peptide position is represented by 21 bars (one bar for each of the 20 amino acids, and a deletion (last bar). The height of each bar indicates the median signal intensity.

Towards this goal, the inventors have made the surprising discovery that it is possible to increase the effective number of x-mer peptide sequences represented on a single array by preparing an array of peptides, where each peptide has an overall length N, and where N is greater than x. Turning to FIG. 8, an example 15-mer peptide is illustrated as a series of 15 blocks with each block representing a single amino acid. The 15-mer peptide defines a composite sequence that can be broken down into a series of overlapping 6-mer elements having a 1 amino acid tiling resolution. Effectively, the 15-mer peptide sequence provides for up to 10 unique 6-mer peptide sequences. In the case of an array having 3 million features, up to 3 million 15-mer peptides can be prepared representing up to 30 million unique 6-mer peptide sequences (i.e., ten 6-mer peptides for each of the 30 million 15-mer peptide features). This approach can be genericized to any composite peptide of length N representing a plurality of x-mer elements. Moreover, it is not necessary for the x-mer elements to overlap with a 1 amino acid tiling resolution. The tiling resolution can be modified to be 2 amino acids or greater overlap, or the x-mer elements may not overlap at all.

In one embodiment, an engineered peptide library comprises a plurality of peptide features. Each of the peptide features includes at least one peptide, where the at least one peptide comprises a composite region having a defined sequence of amino acids of length N. The composite region represents k different elements, where each of the different elements, k, have a defined sequence of amino acids of length x. Notably, x, N and k are integers and x is necessarily less than N. In the case x is at least one less than N (i.e., $x<N-1$), k is at least 2. In some embodiments, k is at least 3, 4, or 5. A total number of different elements represented by the engineered peptide library can be defined as $K_{Eng}$, and the number of peptide features included in the engineered peptide library can be defined as F, where $K_{Eng}$ is greater than F. In the above example, $K_{Eng}$ is at least 0.8*k*F, which indicates that at least 80% of the x-mer peptide elements collectively represented by the 15-mer composite sequences are unique. In any of the embodiments, $K_{Eng}$ may be at least 0.85*k*F. In any of the embodiments, $K_{Eng}$ may be at least 0.9*k*F. In any of the embodiments, $K_{Eng}$ may be at least 0.95*k*F. In any of the embodiments, $K_{Eng}$ may be at least 0.99*k*F. In any of the embodiments, $K_{Eng}$ may be at least 0.999*k*F. Depending on the approach used, $K_{Eng}$ can be at least 0.8*k*F, 0.85*k*F, 0.95*k*F, 0.9*k*F, 0.99*k*F, 0.999*k*F, or greater.

While it can be computationally challenging to identify at least 3 million N-mer sequences representing only unique x-mer elements (depending on the numbers selected for N and x), the inventors have further discovered an efficient algorithm that enables selecting N-mer peptides, where the represented x-mers approach a fully unique population of peptide sequences. According to the present disclosure, an algorithmic approach can be used to prepare a set of N-mer composite sequences in a relative short amount of time. This algorithm was developed using Perl, a general-purpose scripting language. The algorithm generates peptides by randomly selecting an amino acid for each position of the N-mer peptide from a list of available amino acids. The algorithm then tiles through the newly generated peptide and identifies all possible x-mer elements present, which are added to a list of elements the algorithm has encountered. Next, it generates a new N-mer peptide and performs the same tasks as described above, except this time around if it encounters an x-mer element already present in the list of encountered elements, the newly generated N-mer peptide is discarded. This process is repeated until the user specified number of N-mer peptides are attained. Additionally, the algorithm also keeps track of how many times it sees each x-mer element and grants the user control over defining the number of permissible repeats of a given element.

Notably, the algorithm is truly versatile and can be used for any N-mer peptide and x-mer element, as long as $x<N$. In the present disclosure, the non-limiting example of 15-mer composite peptides and 6-mer elements was explored. Using this approach, it was possible to generate about 3 million 15-mer peptides representing greater than 30 million unique 6-mer peptide sequences, representing just under half of all possible unique 6-mer sequences prepared from all 20 canonical amino acids. A single peptide array was then synthesized with each of the 3 million plus 15-mer peptides identified using the described algorithm and the array was effectively used to identify binders for the target DsbA. It should be appreciated that using an array of 3 million features with each feature having a different 5-mer peptide synthesized thereon (i.e., a 5-mer array as opposed to a 15-mer array), was insufficient to identify binders having desired characteristics for DsbA as compared with the use of the 15-mer arrays according to the present disclosure.

It should be further appreciated that the present approach is effective for preparing peptide libraries having enhanced subsequence diversity. That is to say, many approaches are available for preparing a set of unique N-mer peptide sequences. For example, a list of unique 15-mer peptides can be easily generated where each peptide differs from the next without regard to considering subsequences (i.e., x-mer elements represented by the overall sequence of the N-mer). With reference to Table 1, six such sets of unique 15-mer peptides were prepared without regard to subsequence composition. The resulting peptides were then analyzed to identify the number of unique 6-mer peptides represented therein. The max # of possible 6-mer peptides indicates the maximum number of unique 6-mer peptides that can be represented with about 3 million 15-mer peptides. The number of actual unique 6-mer peptides then indicates exactly how many unique 6-mers were ultimately represented by the randomly prepared list of unique 15-mer peptides sequences for each of the six sets. The last column indicates the percentage of represented 6-mers as compared to the maximum possible number of 6-mers. In all six cases, it was determined that the 15-mer peptides represented about 73.6% of the maximum number possible.

TABLE 1

Unique 6-mers represented by randomly unique 15-mer peptides sequences prepared by comparative method

| | Max # of possible 6mer peptides | # of actual unique 6mer peptides | % of unique 6mers |
|---|---|---|---|
| Trial - 1 | 30,453,000 | 22,418,431 | 73.62 |
| Trial - 2 | 30,453,000 | 22,421,503 | 73.63 |
| Trial - 3 | 30,453,000 | 22,419,142 | 73.62 |
| Trial - 4 | 30,453,000 | 22,417,260 | 73.61 |
| Trial - 5 | 30,453,000 | 22,421,390 | 73.63 |
| Trial - 6 | 30,453,000 | 22,419,311 | 73.62 |

In contrast to the data shown in Table 1, by using the disclosed approach it was possible to increase the diversity of 6-mer peptides sequences represented by a population of 15-mer peptides to nearly 100%. In particular, the disclosed algorithm was capable of yielding an equal number of 15-mer peptides representing 30,325,760 unique 6-mer peptide sequences, or 99.6% of the maximum number of unique 6-mers possible in the present approach. Without being limited by theory, it is hypothesized that by increasing the local diversity within each N-mer peptide, it is possible to increase the global sequence diversity represented on a given peptide array, thereby enabling greater capacity to effectively identify peptide binders for a given target. Table 2 further illustrates x-mer representation for a series of N-mer arrays.

TABLE 2

Unique X-mers represented by randomly unique N-mer peptides sequences prepared by inventive method

| Design | Overall peptide length, N in amino acids | Total number of amino acids (millions) | No. unique 5-mers represented using all 20 aa | No. unique 6-mers represented using all 20 aa |
|---|---|---|---|---|
| 5-mer array excluding methionine | 5 | 15.2 | 3,035,196 (94.9%) | Not applicable |
| 16-mer human proteome tiling array | 16 | 96 | 2,344,679 (73.3%) | 7,909,287 (12.4%) |
| Pseudo 6-mer (excl. methionine) | 15 | 45 | 2,476,099 (77.4%) | 30,325,760 (47.4%) |

In Table 2, the first row (5-mer array) represents a 5-mer design that includes every 5-mer sequence prepared from all 20 canonical amino acids excluding methionine. This approach provides for a total of 3,035,196 unique peptides representing 94.9% of all possible 5-mer sequences prepared from all 20 canonical amino acids. As each peptide is limited to 5 amino acids in length, the array necessarily does not represent any 6-mer peptide sequences. The second array includes 16-mer peptides tiled across the entire human proteome. This design represents 73.3% of all possible 5-mer peptides prepared from all 20 canonical amino acids. Notably, this number is much less than 100% as the human proteome does not include all possible 5-mer peptide sequences prepared from all 20 canonical amino acids. Each 16-mer peptide in this design can represent up to 11 unique 6-mer elements; however, as the design is not optimized for 6-mers and is simply a representation of the human proteome, only 12.4% of all possible 6-mer peptides sequences are represented.

Now considering the "pseudo-6-mer" design in row three, an array of 15-mer sequences selected for both uniqueness and subsequence diversity was prepared according to the methods disclosed herein. This design further excluded the use of methionine. The resulting library represented 77.4% of all possible 5-mer sequences prepared from all 20 canonical amino acids, and 47.4% of all possible 6-mer sequences prepared from all 20 canonical amino acids using a single array having about 3 million features. Notably, this final approach greatly expands upon the subsequence diversity of the 6-mer elements of the overarching 15-mer composite peptides.

In some embodiments, N is at least 6, 7, 8, 9, 10, 11, 12, 13, 14, 15, 16, 17, 18, 19, or 20 amino acids. In some embodiments, N is at least 7, 8, 9, 10, 11, 12, 13, 14, or 15 amino acids. In some embodiments, N is 6 to 20 amino acids. In some embodiments, N is 7 to 16 amino acids.

In some embodiments, x is at least 4, 5, 6, 7, 8, 9, 10, 11, 12, 13, 14, 15, 16, 17, 18, or 19. In some embodiments, x is at least 5, 6, 7, 8, 9, 10, 11, 12, 13, or 14. In some embodiments, x is 5 to 19 amino acids. In some embodiments, x is 5 to 12 amino acids. In some embodiments, x is 6 to 14 amino acids. In some embodiments, x is 6 to 10 amino acids. In some embodiments, x is 6 to 9 amino acids.

In some embodiments, the plurality of peptides represents at least about 80%, 85%, 90%, or 95%. In some embodiments, the plurality of peptides represents about 80-100%, 85-100%, 90-100%, 95-100%, 80-99.9%, 85-99.9%, 90-99.9%, 95-99.9%, 80-99%, 85-99%, 90-99%, or 95-99% of a target proteome.

For application of peptides arrays according to the present disclosure, it is useful, in general, to assess peptide populations by interrogating a population of peptide features in the presence of a receptor having an affinity for a plurality of binder sequences. A receptor includes any peptide, protein, antibody, small molecule, or other like structure that is capable of specifically binding a given peptide sequence or feature. In general, an aspect of the receptor should be detectable in order to determine whether the receptor is bound to a particular peptide or peptide feature. For example, the receptor itself may include a fluorophore that is detectable with a fluorescence microscope. Alternatively (or in addition), the receptor may be bound by a secondary molecule such as a fluorescent antibody. Further approaches will also fall within the scope of the present disclosure.

As described above the receptor is capable of binding to or otherwise interacting with a known binder sequence or affinity sequence. One example of a binder sequence is a defined amino acid sequence or motif. The defined amino acid sequence can represent at least a portion of a full length peptide within the synthetic peptide population. However, the binder sequence can itself be a full length peptide. For example, the eight amino acid peptide sequence Trp-Ser-His-Pro-Gln-Phe-Glu-Lys (SEQ ID NO: 1) known as a "Strep-tag" exhibits intrinsic affinity towards an engineered form of the protein streptavidin. According to the present disclosure, a Strep-tag can be incorporated at either the N-terminus or the C-terminus of a given peptide or even incorporated at an intermediate point within a peptide. Thereafter, the peptide population including the peptides consisting of (or comprising) the Strep-tag binder sequence can be bound by the streptavidin receptor. Binding of streptavidin to the Strep-tag sequence can then be detected using various techniques. Further examples of binder sequences include the hexahistidine-tag (His-tag) (SEQ ID NO: 2), FLAG-tag, calmodulin-binding peptide, covalent yet dissociable peptide, heavy chain of protein C tag, and the like. Alternative (or additional) binder sequence-receptor pairs will also fall within the scope of the present disclosure.

With continued reference to binder sequences as disclosed herein, each binder sequence will have a particular or defined amino acid sequence. A binder sequence can include at least three amino acids. Example binder sequences disclosed here include between about five amino acids and about twelve amino acids. However, binder sequences having less than five or more than twelve amino acids can also be used. The positions of each amino acid in a particular binder sequence can be defined starting at either the N-terminus ([N]) or C-terminus ([C]). For example, the positions of the amino acids in the aforementioned Strep-tag binder sequence can be defined as [N]-Trp-Ser-His-Pro-Gln-Phe-Glu-Lys-[C] (SEQ ID NO: 1). Accordingly, the position of the amino acid Histidine (His) is defined as the third amino acid from the N-terminus of the Strep-tag binder sequence. Notably, and as described above, the Strep-tag binder sequence can be flanked by one or more additional amino acids at either or both of the N-terminus and the C-terminus.

A method according to the present disclosure further includes detecting a signal output characteristic of an interaction of the receptor with the first control peptide feature. A step of detecting a signal output can include any manner of monitoring or otherwise observing a measurable aspect of one or more peptides or peptide features within a population of peptides in the presence or absence of a receptor. Example signal outputs include an optical output (e.g., luminescence), an electrical output, a chemical output, the like, and combinations thereof. As a result, the step of detecting the signal output can include measuring, recording, or otherwise observing the signal output using any suitable instrument. Example instruments include optical and digital detection instruments such as fluorescence microscopes, digital cameras, or the like.

In some embodiments, detecting a signal output further includes a perturbation such as excitation with light at one or more wavelengths, thermal manipulation, introduction of one or more chemical reagents, the like, and combinations thereof. Notably, a synthetic peptide population can include a population of peptide features that is synthesized to include alternative building blocks such as non-natural amino acids, amino acid derivatives, or other monomer units altogether.

II. Peptides

According to various embodiments of the instant disclosure, peptides (e.g., control peptides, peptide binder sequences) are disclosed. Each of the peptides includes two or more natural or non-natural amino acids as described herein. In examples described herein, a linear form of peptide is shown. However, one of skill in the art would immediately appreciate that the peptides can be converted to a cyclic form, e.g., by reacting the N-terminus with the C-terminus as disclosed in the U.S. Pat. Pub. No. 2015/0185216 to Albert et al. and filed on Dec. 19, 2014. The embodiments of the technology therefore include both cyclic peptides and linear peptides.

As used herein, the terms "peptide," "oligopeptide," and "peptide binder" refer to organic compounds composed of amino acids, which may be arranged in either a linear chain (joined together by peptide bonds between the carboxyl and amino groups of adjacent amino acid residues), in a cyclic form (cyclized using an internal site) or in a constrained form (e.g., "macrocycle" of head-to-tail cyclized form). The terms "peptide" or "oligopeptide" also refer to shorter polypeptides, i.e., organic compounds composed of less than 50 amino acid residues. A macrocycle (or constrained peptide), as used herein, is used in its customary meaning for describing a cyclic small molecule such as a peptide of about 500 Daltons to about 2,000 Daltons.

The term "natural amino acid" or "canonical amino acid" refers to one of the twenty amino acids typically found in proteins and used for protein biosynthesis as well as other amino acids which can be incorporated into proteins during translation (including pyrrolysine and selenocysteine). The twenty natural amino acids include the L-stereoisomers of histidine (His; H), alanine (Ala; A), valine (Val; V), glycine (Gly; G), leucine (Leu; L), isoleucine (Ile; I), aspartic acid (Asp; D), glutamic acid (Glu; E), serine (Ser; S), glutamine (Gln; Q), asparagine (Asn; N), threonine (Thr; T), arginine (Arg; R), proline (Pro; P), phenylalanine (Phe; F), tyrosine (Tyr; Y), tryptophan (Trp; W), cysteine (Cys; C), methionine (Met; M), and lysine (Lys; K). The term "all twenty amino acids" refers to the twenty natural amino acids listed above.

The term "non-natural amino acid" refers to an organic compound that is not among those encoded by the standard genetic code, or incorporated into proteins during translation. Therefore, non-natural amino acids include amino acids or analogs of amino acids, but are not limited to, the D-stereoisomers of all twenty amino acids, the beta-amino-analogs of all twenty amino acids, citrulline, homocitrulline, homoarginine, hydroxyproline, homoproline, ornithine, 4-amino-phenylalanine, cyclohexylalanine, α-aminoisobutyric acid, N-methyl-alanine, N-methyl-glycine, norleucine, N-methyl-glutamic acid, tert-butylglycine, α-aminobutyric acid, tert-butylalanine, 2-aminoisobutyric acid, α-aminoisobutyric acid, 2-aminoindane-2-carboxylic acid, selenomethionine, dehydroalanine, lanthionine, γ-amino butyric acid, and derivatives thereof wherein the amine nitrogen has been mono- or di-alkylated.

According to embodiments of the instant disclosure, peptides are presented immobilized on a support surface (e.g., a microarray, a bead, or the like). In some embodiments, peptides selected for use as control peptides may optionally undergo one or more rounds of extension and maturation processes to yield the control peptides disclosed herein.

III. Microarrays

The peptides disclosed herein can be generated using oligopeptide microarrays. As used herein, the term "microarray" refers to a two dimensional arrangement of features on the surface of a solid or semi-solid support. A single microarray or, in some cases, multiple microarrays (e.g., 3, 4, 5, or more microarrays) can be located on one solid support. For a solid support having fixed dimensions, the size of the microarrays depends on the number of microarrays on the solid support. That is, the higher the number of microarrays per solid support, the smaller the arrays have to be to fit on the solid support. The arrays can be designed in any shape, but preferably they are designed as squares or rectangles. The ready to use product is the oligopeptide microarray on the solid or semi-solid support (microarray slide).

The terms "peptide microarray" or "oligopeptide microarray," or "peptide chip," or "peptide epitope microarray" refer to a population or collection of peptides displayed on a microarray, i.e., a solid surface, for example a glass, carbon composite or plastic array, slide, or chip.

The term "feature" refers to a defined area on the surface of a microarray. The feature comprises biomolecules, such as peptides (i.e., a peptide feature), nucleic acids, carbohydrates, and the like. One feature can contain biomolecules with different properties, such as different sequences or orientations, as compared to other features. The size of a feature is determined by two factors: i) the number of features on an array, the higher the number of features on an array, the smaller is each single feature, ii) the number of individually addressable aluminum mirror elements which are used for the irradiation of one feature. The higher the number of mirror elements used for the irradiation of one feature, the bigger is each single feature. The number of features on an array may be limited by the number of mirror elements (pixels) present in the micromirror device. For example, the state of the art micromirror device from Texas Instruments, Inc. (Dallas, Tex.) currently contains 4.2 million mirror elements (pixels), thus the number of features within such exemplary microarray is therefore limited by this number. However, higher density arrays are possible with other micromirror devices.

The term "solid or semi-solid support" refers to any solid material, having a surface area to which organic molecules can be attached through bond formation or absorbed through electronic or static interactions such as covalent bonds or complex formation through a specific functional group. The support can be a combination of materials such as plastic on glass, carbon on glass, and the like. The functional surface can be simple organic molecules but can also comprise of co-polymers, dendrimers, molecular brushes, and the like.

The term "plastic" refers to synthetic materials, such as homo- or hetero-co-polymers of organic building blocks (monomer) with a functionalized surface such that organic molecules can be attached through covalent bond formation or absorbed through electronic or static interactions such as through bond formation through a functional group. Preferably the term "plastic" refers to polyolefin, which is a polymer derived by polymerization of an olefin (e.g., ethylene propylene diene monomer polymer, polyisobutylene). Most preferably, the plastic is a polyolefin with defined optical properties, like TOPAS® or ZEONOR/EX®.

The term "functional group" refers to any of numerous combinations of atoms that form parts of chemical molecules, that undergo characteristic reactions themselves, and that influence the reactivity of the remainder of the molecule. Typical functional groups include, but are not limited to, hydroxyl, carboxyl, aldehyde, carbonyl, amino, azide, alkynyl, thiol, and nitril. Potentially reactive functional groups include, for example, amines, carboxylic acids, alcohols, double bonds, and the like. Preferred functional groups are potentially reactive functional groups of amino acids such as amino groups or carboxyl groups.

Various methods for the production of oligopeptide microarrays are known in the art. For example, spotting prefabricated peptides or in situ synthesis by spotting reagents (e.g., on membranes) exemplify known methods. Other known methods used for generating peptide arrays of higher density are the so-called photolithographic techniques, where the synthetic design of the desired biopolymers is controlled by suitable photolabile protecting groups (PLPG) releasing the linkage site for the respective next component (amino acid, oligonucleotide) upon exposure to electromagnetic radiation, such as light (Fodor et al., (1993) Nature 364:555-556; Fodor et al., (1991) Science 251:767-773). Two different photolithographic techniques are known in the state of the art. The first is a photolithographic mask, used to direct light to specific areas of the synthesis surface effecting localized deprotection of the PLPG. "Masked" methods include the synthesis of polymers utilizing a mount (e.g., a "mask") which engages a substrate and provides a reactor space between the substrate and the mount. Exemplary embodiments of such "masked" array synthesis are described in, for example, U.S. Pat. Nos. 5,143,854 and 5,445,934, the disclosures of which are hereby incorporated by reference. Potential drawbacks of this technique, however, include the need for a large number of masking steps resulting in a relatively low overall yield and high costs, e.g., the synthesis of a peptide of only six amino acids in length could require over 100 masks. The second photolithographic technique is the so-called maskless photolithography, where light is directed to specific areas of the synthesis surface effecting localized deprotection of the PLPG by digital projection technologies, such as micromirror devices (Singh-Gasson et al., Nature Biotechn. 17 (1999) 974-978). Such "maskless" array synthesis thus eliminates the need for time-consuming and expensive production of exposure masks. It should be understood that the embodiments of the systems and methods disclosed herein may comprise or utilize any of the various array synthesis techniques described above.

The use of PLPG (photolabile protecting groups), providing the basis for the photolithography based synthesis of oligopeptide microarrays, is well known in the art. Commonly used PLPG for photolithography based biopolymer synthesis are for example α-methyl-6-nitropiperonyl-oxycarbonyl (MeNPOC) (Pease et al., Proc. Natl. Acad. Sci. USA (1994) 91:5022-5026), 2-(2-nitrophenyl)-propoxycarbonyl (NPPOC) (Hasan et al. (1997) Tetrahedron 53: 4247-4264), nitroveratryloxycarbonyl (NVOC) (Fodor et al. (1991) Science 251:767-773) and 2-nitrobenzyloxycarbonyl (NBOC).

Amino acids have been introduced in photolithographic solid-phase peptide synthesis of oligopeptide microarrays, which were protected with NPPOC as a photolabile amino protecting group, wherein glass slides were used as a support (U.S. App. Pub. No. 20050101763). The method using NPPOC protected amino acids has the disadvantage that the half-life upon irradiation with light of all (except one) protected amino acids is within the range of approximately 2 to 3 minutes under certain conditions. In contrast, under the same conditions, NPPOC-protected tyrosine exhibits a half-life of almost 10 minutes. As the velocity of the whole synthesis process depends on the slowest sub-process, this phenomenon increases the time of the synthesis process by a factor of 3 to 4. Concomitantly, the degree of damage by photogenerated radical ions to the growing oligomers increases with increasing and excessive light dose requirement.

As understood by one of skill in the art, peptide microarrays comprise an assay principle whereby thousands (or in the case of the instant disclosure, millions) of peptides (in some embodiments presented in multiple copies) are linked or immobilized to the surface of a solid support (which in some embodiments comprises a glass, carbon composite or plastic chip or slide).

In some embodiments, a peptide microarray is exposed to a sample of interest such as a receptor, antibody, enzyme, peptide, oligonucleotide, or the like. The peptide microarray exposed to the sample of interest undergoes one or more washing steps, and then is subjected to a detection process. In some embodiments, the array is exposed to an antibody targeting the sample of interest (e.g. anti IgG human/mouse or anti-phosphotyrosine or anti-myc). Usually, the secondary antibody is tagged by a fluorescent label that can be detected by a fluorescence scanner. Other detection methods are chemiluminescence, colorimetry, or autoradiography. In other embodiments, the sample of interest is biotinylated, and then detected by streptavidin conjugated to a fluorophore. In yet other embodiments, the protein of interest is tagged with specific tags, such as His-tag, FLAG-tag, Myc-tag, etc., and detected with a fluorophore-conjugated antibody specific for the tag.

After scanning the microarray slides, the scanner records a 20-bit, 16-bit or 8-bit numeric image in tagged image file format (*.tif). The tif-image enables interpretation and quantification of each fluorescent spot on the scanned microarray slide. This quantitative data is the basis for performing statistical analysis on measured binding events or peptide modifications on the microarray slide. For evaluation and interpretation of detected signals an allocation of the peptide spot (visible in the image) and the corresponding peptide sequence has to be performed.

A peptide microarray is a slide with peptides spotted onto it or assembled directly on the surface by in situ synthesis. Peptides are ideally covalently linked through a chemoselective bond leading to peptides with the same orientation for interaction profiling. Alternative procedures include unspecific covalent binding and adhesive immobilization.

According one specific embodiment of the instant disclosure, the specific peptide binders are identified using maskless array synthesis in the fabrication of the peptide binder probes on the substrate. According to such embodiments, the maskless array synthesis employed allows ultra-high density peptide synthesis of up to 2.9 million unique peptides. Each of the 2.9 million features/regions having up to 107 reactive sites that could yield a full-length peptide. Smaller arrays can also be designed. For example, an array representing a comprehensive list of all possible 5-mer peptides using 19 natural amino acids excluding cysteine will have 2,476,099 peptides. In other examples, an array may include non-natural amino acids as well as natural amino acids. An array of 5-mer peptides by using all combinations of 18 natural amino acids excluding cysteine and methionine may also be used. Additionally, an array can exclude other amino acids or amino acid dimers. In some embodiments, an array may be designed to exclude any dimer or a longer repeat of the same amino acid, as well as any peptide containing HR, RH, HK, KH, RK, KR, HP, and PQ sequences to create a library of 1,360,732 unique peptides. Smaller arrays may have replicates of each peptide on the same array to increase the confidence of the conclusions drawn from array data.

In various embodiments, the peptide arrays described herein can have at least about $1.0\times10^5$, $1.2\times10^5$, $1.4\times10^5$, $1.6\times10^5$, $1.8\times10^5$, $2.0\times10^5$, $1.6\times10^6$, $1.8\times10^6$, $2.0\times10^6$ peptides, and/or up to about $1.0\times10^7$, $5.0\times10^7$, $8.0\times10^7$, $1.0\times10^8$ peptides or any number or ranges in-between, attached to the solid support of the peptide array. As described herein, a peptide array comprising a particular number of peptides can mean a single peptide array on a single solid support, or the peptides can be divided and attached to more than one solid support to obtain the number of peptides described herein.

Arrays synthesized in accordance with such embodiments can be designed for peptide binder discovery in the linear or cyclic form (as noted herein) and with and without modification such as N-methyl or other post-translational modifications. Arrays can also be designed for further extension of potential binders using a block-approach by performing iterative screens on the N-terminus and C-terminus of a potential hit (as is further described in detail herein). Once a hit of an ideal affinity has been discovered it can be further matured using a combination of maturation arrays (described further herein), that allow a combinatorial insertion, deletion and replacement analysis of various amino acids both natural and non-natural.

The peptide arrays of the instant disclosure are used to identify the specific binders or binder sequences of the technology as well as for maturation and extension of the binder sequences for use in the design and selection of control peptides.

IV. Peptide Binder Discovery

In one aspect, the present disclosure provides for the discovery of novel binders. Turning now to FIG. 1, according to one embodiment of the instant disclosure, a peptide array 100 may be designed comprising a population of hundreds, thousands, tens of thousands, hundreds of thousands and even millions of peptides 102. In some embodiments, the population of peptides 102 can be configured such that the peptides 102 collectively represent an entire protein, gene, chromosome, or even an entire genome of interest (e.g., a human proteome). Additionally, the peptides 102 can be configured according to specific criteria, whereby specific amino acids or motifs are excluded. Furthermore, the peptides 102 can be configured such that each of the peptides 102 comprises an identical length. For example, in some embodiments the population of peptides 102 immobilized on an array substrate 104 may all comprise 3-, 4-, 5-, 6-, 7-, 8-, 9-, 10-, 11-, or even 12-mers, or more. In some embodiments, the peptides 102 can also each comprise an N-terminal sequence (N-term 106) or a C-terminal sequence (C-term 108), where each peptide 102 comprises both an N-terminal sequence and a C-terminal peptide sequence of a specific and identical length (e.g., 3-, 4-, 5-, 6-, 7- or even 8-mers or more). Notably, the sequences of the peptides at specific locations on the array are known.

According to some embodiments, a peptide array 100 is designed including a population of up to 2.9 million peptides 102, configured such that the 2.9 million peptides 102 represents a comprehensive list of all possible 5-mer probe peptides 110 of a genome, immobilized on the array substrate 104. In some such embodiments, the 5-mer probe peptides 110 (comprising the 2.9 million peptides of the array) may exclude one or more of the twenty amino acids. For example, Cys could be excluded in order to aid in controlling unusual folding of the peptide. The amino acid Met could be excluded as a rare amino acid within the proteome. Other optional exclusions are amino acid repeats of two or more of the same amino acid (in order to aide in controlling non-specific interactions such as charge and hydrophobic interactions); or particular amino acid motifs (e.g., in case of streptavidin binders), those consisting of His-Pro-Gln sequence, where His-Pro-Gln is a known streptavidin binding motif. With continued reference to FIG. 1, in some illustrative embodiments, the 5-mer probe peptides 110 may exclude one, or more than one of the amino acids or amino acid motifs listed above. One embodiment of the technology includes a peptide array 100 comprising a population of up to 2.9 million peptides 102, where the 5-mer probe peptides 110 portions of the peptides 102 represent the entire human genome. In one example, the 5-mer probe peptides 110 do not include the amino acids Cys and Met, do not include amino acid repeats of two or more amino acids, and do not include the amino acid motif His-Pro-Gln. Another embodiment of the technology includes a peptide array comprising up to 2.9 million peptides 102 including the 5-mer probe peptides 110, representing the protein content encoded by the entire human genome, wherein the 5-mer probe peptides 110 do not include the amino acids Cys and Met, and do not include amino acid repeats of two or more amino acids.

According to further embodiments, each 5-mer probe peptide 110 comprising the population of up to 2.9 million peptides 102 of the peptide array 100 may be synthesized with five cycles of wobble synthesis in each of the N-term 106 and the C-term 108 as shown in FIG. 1. As used herein "wobble synthesis" refers to synthesis (through any of the means disclosed herein) of a sequence of peptides (either constant or random) which are positioned at the N-terminus or C-terminus of the 5-mer probe peptides 110 of interest. As illustrated in FIG. 1, the specific amino acids comprising the wobble synthesis at either the N-term 106 or the C-term 108 are represented by a "Z." According to various embodiments, wobble synthesis may include any number of amino acids or other monomer units at the N-term 106 or the C-term 108 For example, each of the N-term 106 and the C-term 108 can include 1, 2, 3, 4, 5, 6, 7, 8, 9, 10, or more (e.g., 15-20) amino acids. Furthermore, wobble synthesis may comprise N-termini and C-termini having the same or differing number of wobble synthesized amino acids.

According to various embodiments, the wobble oligopeptide compositions of the N-term 106 and the C-term 108 are flexible in terms of amino acid composition and in terms of amino acid ratios or concentrations. For example, the wobble oligopeptide compositions may comprise a mixture of two or more amino acids. An illustrative embodiment of a flexible wobble mix includes a wobble oligopeptide composition of Gly and Ser at a ratio of 3:1 (Gly:Ser). Other examples of a flexible wobble mixture include equal concentrations (e.g., equal ratios) of amino acids Gly, Ser, Ala, Val, Asp, Pro, Glu, Leu, Thr, equal concentrations (e.g., equal ratios) of amino acids Leu, Ala, Asp, Lys, Thr, Gln Pro, Phe, Val, Tyr, and combinations thereof. Other examples include wobble oligopeptide compositions for the N-term 106 and the C-term 108 comprising any of the twenty canonical amino acids, in equal concentrations.

As disclosed herein, wobble oligopeptide synthesis of the various embodiments allows for generating a peptide on an array having a combination of random and directed synthesis amino acids. For example, an oligopeptide probe on an array may comprise a combined 15-mer peptide having a peptide sequence in the following format: ZZZZZ-[5-mer]-ZZZZZ, where Z is an amino-acid from a particular wobble amino acid mixture. In another aspect, ZZZZZ can be abbreviated as 5Z, whereas nZ corresponds to n consecutive amino acids selected from a set of amino acids comprising a wobble amino acid mixture.

In some embodiments, a feature may contain about $10^7$ peptides. In some such embodiments, the population complexity for each feature may vary depending on the complexity of the wobble mixture. As disclosed herein, creating such complexity using wobble synthesis in a semi-directed synthesis enables the screening of binders on the array, using peptides with diversity up to about $10^{12}$ unique sequences. Examples of binder screening for Streptavidin are set forth below. However, additional protein targets such as prostate specific antigen, urokinase, or tumor necrosis factor are also possible according to the methods and systems set forth.

It has further been discovered that linkers (e.g., N-term 106 and C-term 108) can vary in length and are optional. In some embodiments, instead of a 5Z linker, a 3Z or a 1Z linker can be used. In such embodiments, Z could be synthesized using a random mixture of all 20 amino acids. It has been discovered that the same target can yield additional 5-mer binder sequences when 1Z linker or no linker is used. It has been discovered that changing the length of or eliminating the linker results in identification of additional peptide binders that were not found using e.g., the original 5Z linker.

In practice, with reference to FIG. 1, a peptide array 100 includes an array substrate 104 comprising a solid support 112 having a reactive surface 114 (e.g., a reactive amine layer) with a population of peptides 102 (such as a population of 5-mers representing the entire human proteome) immobilized thereto. The exemplary 5-mer peptides comprising the population of peptides 102, according to such embodiment, does not include any of the amino acids Cys and Met, does not include amino acid repeats of two or more amino acids and does not include the amino acid motif His-Pro-Gln. According to embodiment illustrated in FIG. 1, the population of peptides 102 representing the entire human proteome would comprise 1,360,732 individual peptides comprising the population of peptides 102. In some embodiments, duplicates or repeats may be placed on the same array. For example, a population of peptides 102 comprising a single duplicate would comprise 2,721,464 individual features. Additionally, the peptides 102 each comprise an N-terminal and C-terminal wobble synthesis oligopeptide (i.e., N-term 106 and C-term 108. In one example, the N-term 106 and C-term 108 each have five amino acids, where each of the amino acids is randomly selected from a mixture of Gly and Ser in a 3:1 ratio (Gly:Ser). The wobble oligopeptides forming the N-term 106 and the C-term 108 can be omitted or replaced with a single amino acid selected from a random mixture of all twenty amino canonical acids, non-natural amino acids (e.g., 6-amino-hexanoic acid), or a combination thereof. Some embodiments can include non-amino acid moieties (e.g., polyethylene glycol).

Figure 2:
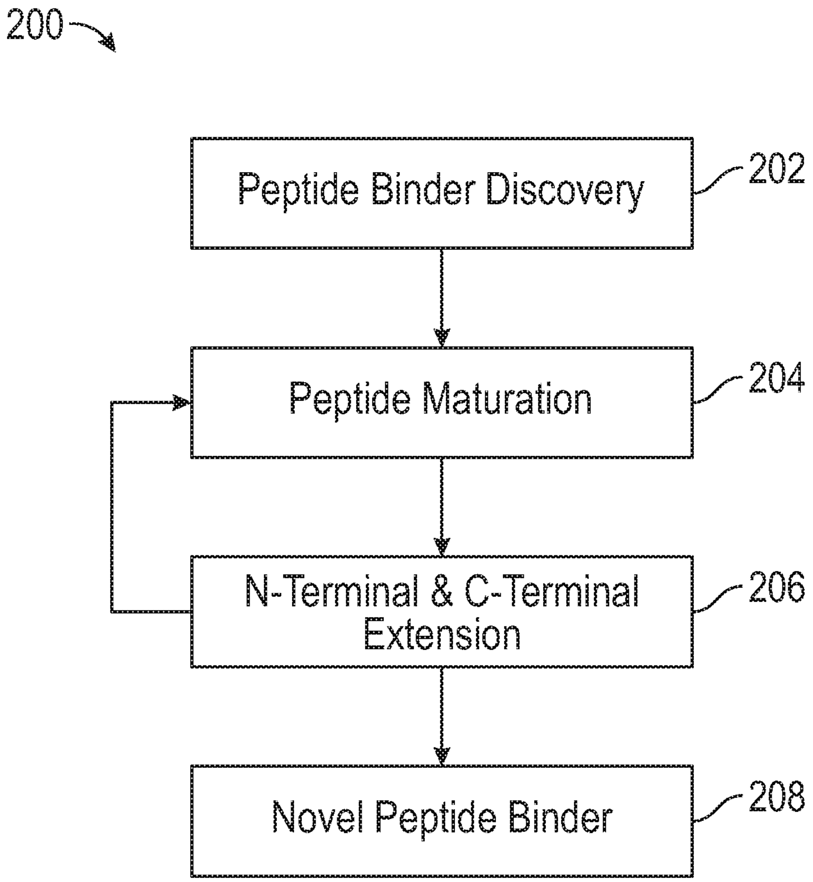
FIG. 2 is an example of a method for identifying peptide binders according to the present disclosure.

Referring generally now to FIG. 2, a process 200 for preparing a peptide array (e.g. peptide array 100 as shown in FIG. 1) includes a step 202 of peptide binder discovery. In one example of the step 202, a peptide array is exposed to a concentrated, purified protein of interest (as with standard microarray practice), whereby the protein of interest may bind or otherwise interact with one or more of the population of peptides (e.g. the population of peptides 102 as shown in FIG. 1). In one aspect, the protein of interest may bind a selected one of the population of peptides independent of another one of the population of peptides comprising the population. After exposure to the protein of interest, binding of the protein of interest to the peptide binders is assayed, for example, by way of exposing the array to an antibody (specific for the protein) which has a reportable label (e.g., peroxidase) attached thereto. Because the peptide sequence of each 5-mer at each location on the array is known, it is possible to chart, or quantify, or compare and contrast the sequences (and binding strengths) of the binding of the protein to specific 5-mer peptide sequences. One such method of comparing the protein binding to the peptides comprising the population is to review the binding in a principled analysis distribution-based clustering, such as described by White et al. (Standardizing and Simplifying Analysis of Peptide Library Data, Chem. Inf. Model., 2013, 53(2), pp 493-499), and illustrated herein. As is exemplified herein, the clustering of protein-5-mer binding (a.k.a., "hits"; shown in a principled analysis distribution-based clustering) indicates 5-mers having overlapping peptide sequences. As demonstrated in greater detail below, from the overlapping peptide sequences (of each cluster), a "core hit" peptide sequence (e.g., a peptide sequence shared by the prominent protein-peptide binding events of the array) can be identified, or at least hypothesized and constructed for further evaluation. In one aspect, an array as exemplified herein may identify more than one core hit peptide sequence. Further, it is possible for the core hit peptide sequence to comprise more amino acids than, for example, the 5-mer peptide binders comprising the population of peptides due to possible identification of overlapping and adjacent sequences during principled analysis distribution-based clustering.

V. Peptide Maturation

With continued reference to FIG. 2, upon identification of a core hit peptide sequence (through the process of peptide binder discovery 202 disclosed, described and exemplified herein), a step 204 of the process 200 includes peptide maturation whereby the core hit peptide sequence is modified in various ways (through amino acid substitutions, deletions and insertions) at each position of the core hit peptide in order to further optimize or verify the proper core hit sequence. For example, according to some embodiments (e.g., where the core hit peptide sequence comprises a given number of amino acids), a maturation array is produced. According to the instant disclosure, the maturation array may have, immobilized thereto, a population of core hit peptides whereby each amino acid in the core hit peptide has undergone an amino acid substitution at each position.

In order to further describe the process of hit maturation or peptide maturation 204, an example or hypothetical core hit peptide is described as consisting of a 5-mer peptide having the amino acid sequence -$M_1M_2M_3M_4M_5$- (SEQ ID NO: 3). According to the instant disclosure, hit maturation 204 may involve any of, or a combination of any or all of, amino acid substitutions, deletions, and insertions at positions 1, 2, 3, 4, and 5. For example, in regard to the hypothetical core hit peptide -$M_1M_2M_3M_4M_5$- (SEQ ID NO: 3), embodiments of the instant disclosure may include the amino acid M at position 1 being substituted with each of the other 19 amino acids (e.g., $A_1M_2M_3M_4M_5$- (SEQ ID NO: 4), $P_1M_2M_3M_4M_5$- (SEQ ID NO: 5), $V_1M_2M_3M_4M_5$- (SEQ ID NO: 6), $Q_1M_2M_3M_4M_5$- (SEQ ID NO: 7), etc.). Each position (2, 3, 4, and 5) would also have the amino acid M substituted with each of the other 19 amino acids (for example, with position 2 the substitutions would resemble, $M_1A_2M_3M_4M_5$- (SEQ ID NO: 8), $M_1Q_2M_3M_4M_5$- (SEQ ID NO: 9), $M_1P_2M_3M_4M_5$- (SEQ ID NO: 10), $M_1N_2M_3M_4M_5$- (SEQ ID NO: 11), etc.). It should be understood that a peptide (immobilized on an array) is created comprising a core hit peptide including one or more substitutions, deletions, insertions, or a combination thereof.

In some embodiments of the process 200, the step 204 of peptide maturation includes the preparation of a double amino acid substitution library. A double amino acid substitution includes altering the amino acid at a first position in combination with substitution of an amino acid at a second position with each of the other nineteen amino acids. This process is repeated until all possible combinations of the first and second positions are combined. By way of example, referring back to the hypothetical core hit peptide having a 5-mer peptide with amino acid sequence -$M_1M_2M_3M_4M_5$- (SEQ ID NO: 3), a double amino acid substitution with regard to positions 1 and 2 may include, for example, an M→P substitution at position 1, and then a substitution of all 20 amino acids at position 2 (e.g., -$P_1A_2M_3M_4M_5$- (SEQ ID NO: 12), -$P_1F_2M_3M_4M_5$- (SEQ ID NO: 13), -$P_1V_2M_3M_4M_5$- (SEQ ID NO: 14), -$P_1E_2M_3M_4M_5$- (SEQ ID NO: 15), etc.), an M→V substitution at position 1, and then a substitution of all 20 amino acids at position 2 (e.g., -$V_1A_2M_3M_4M_5$- (SEQ ID NO: 16), -$V_1F_2M_3M_4M_5$- (SEQ ID NO: 17), -$V_1V_2M_3M_4M_5$- (SEQ ID NO: 18), -$V_1E_2M_3M_4M_5$- (SEQ ID NO: 19), etc.), M→A substitution at position 1, and then a substitution of all 20 amino acids at position 2 (e.g., -$A_1A_2M_3M_4M_5$- (SEQ ID NO: 20), -$A_1F_2M_3M_4M_5$- (SEQ ID NO: 21), -$A_1V_2M_3M_4M_5$- (SEQ ID NO: 22), -$A_1E_2M_3M_4M_5$- (SEQ ID NO: 23), etc.).

In some embodiments of the step 204 of peptide maturation according to the instant disclosure, an amino acid deletion for each amino acid position of the core hit peptide may be performed. An amino acid deletion includes preparing a peptide including the core hit peptide sequence, but deleting a single amino acid from the core hit peptide sequence (such that a peptide is created in which the amino acid at each position is deleted). By way of example, referring back to the hypothetical core hit peptide having a 5-mer peptide with amino acid sequence -$M_1M_2M_3M_4M_5$- (SEQ ID NO: 3), an amino acid deletion would include preparing a series of peptides having the following sequences -$M_2M_3M_4M_5$- (SEQ ID NO: 24); -$M_1M_3M_4M_5$- (SEQ ID NO: 24); -$M_1M_2M_3M_5$- (SEQ ID NO: 24); -$M_1M_2M_3M_5$- (SEQ ID NO: 24); and (SEQ ID NO: 24). It should be noted that, following an amino acid deletion of the hypothetical 5-mer, 5 new 4-mers are created. According to some embodiments of the instant disclosure an amino acid substitution or a double amino acid substitution scan can be performed for each new 4-mer generated.

Similar to the amino acid deletion scan discussed above, some embodiments of the step 204 of peptide maturation disclosed herein may include an amino acid insertion scan, whereby each of the twenty amino acids is inserted before and after every position of the core hit peptide. By way of example, referring back to the hypothetical core hit peptide having a 5-mer peptide with amino acid sequence -$M_1M_2M_3M_4M_5$- (SEQ ID NO: 3), an amino acid insertion scan would include the following sequences, -$XM_1M_2M_3M_4M_5$- (SEQ ID NO: 25); -$M_1XM_2M_3M_4M_5$- (SEQ ID NO: 26); -$M_1M_2XM_3M_4M_5$- (SEQ ID NO: 27); -$M_1M_2M_3XM_4M_5$- (SEQ ID NO: 28); -$M_1M_2M_3M_4XM_5$- (SEQ ID NO: 29); and -$M_1M_2M_3M_4M_5X$- (SEQ ID NO: 30) (where X represents an individual amino, selected from the twenty natural amino acids or a specific, defined subset of amino acids, whereby a peptide replicate will be created for each of the twenty amino acids or defined subset of amino acids).

It should also be understood that the amino acid-substituted peptides, double amino acid-substituted peptides, amino acid deletion scan peptides and amino acid insertion scan peptides described above may also include one, or both of, an N-terminal and C-terminal wobble amino acid sequences (similar to as described for N-term 106 and C-term 108 in FIG. 1). As with the N-terminal and C-terminal wobble amino acid sequences described in FIG. 1 (N-term 106 and C-term 108), the N-terminal and C-terminal wobble amino acid sequences may comprise as few as one amino acid or as many as fifteen or twenty amino acids, and the N-terminal wobble amino acid sequence may be the same length as, longer than, or shorter than the C-terminal wobble amino acid sequence. In another aspect, either or both of the N-terminal wobble sequence and C-terminal wobble sequence can be omitted altogether. Further, the N-terminal and C-terminal wobble amino acid sequences may comprise any defined group of amino acids at any given ratios. For example, the wobble amino acid sequences may comprise glycine and serine in a 3:1 ratio (Gly:Ser), or a random mixture of all twenty canonical amino acids.

In one embodiment of the step 204, a core hit peptide having seven amino acids undergoes exhaustive single and double amino acid screens, and includes both N-terminal and C-terminal wobble amino acid sequences. In this example, each of the N-terminal and C-terminal sequences comprise three amino acids (all glycine). In other embodiments, different terminal sequences may be added by using different mixtures of amino acids during the maturation process. Any single amino acid can be used or any mixture consisting of two or more amino acids. In yet other embodiments, a mixture of Gly and Ser at a ratio 3:1 (Gly:Ser) is used. In other embodiments, a "random mix" is used consisting of a random mixture of all twenty amino acids. In some embodiments, non-natural amino acids (e.g., 6-aminohexanoic acid) are used. Further, some embodiments include non-amino acid moieties (e.g., polyethylene glycol).

Once the various substitution, deletion, and insertion variations of the core hit peptide are prepared (e.g., in immobilized fashion on a solid support such as a microarray), the strength of binding of the purified, concentrated target protein is assayed. As shown in the Examples provided below, the process of hit maturation allows for refining the core hit peptide to an amino acid sequence demonstrating the most preferred amino acid sequence for binding the target protein with the highest affinity.

VI. Peptide Extension (N-Terminal and C-Terminal)

It is possible that motifs identified in 5-mer array experiments represent only short versions of optimal protein binders. In one aspect, the present includes a strategy of identifying longer motifs by extending sequences selected from 5-mer array experiments by one or more amino acids from one or both N- and C-terminus. Starting from a selected peptide and adding one or more amino acids on each of the N-terminus and C-terminus, one can create an extension library for further selection. For example, starting from a single peptide and using all twenty natural amino acids, one can create an extension library of 160,000 unique peptides. In some embodiments, each of the extended peptides is synthesized in replicates.

Referring now to a step 206 of the process 200 in FIG. 2, upon maturation of the core hit peptide (such that a more optimal amino acid sequence of the core hit peptide is identified for binding the target protein) in the step 204, either or both of the N-terminal and C-terminal positions undergo an extension step, whereby the length of the matured core hit peptide from the step 204 is further extended for increasing the specificity and affinity for the target peptide.

Figure 3:
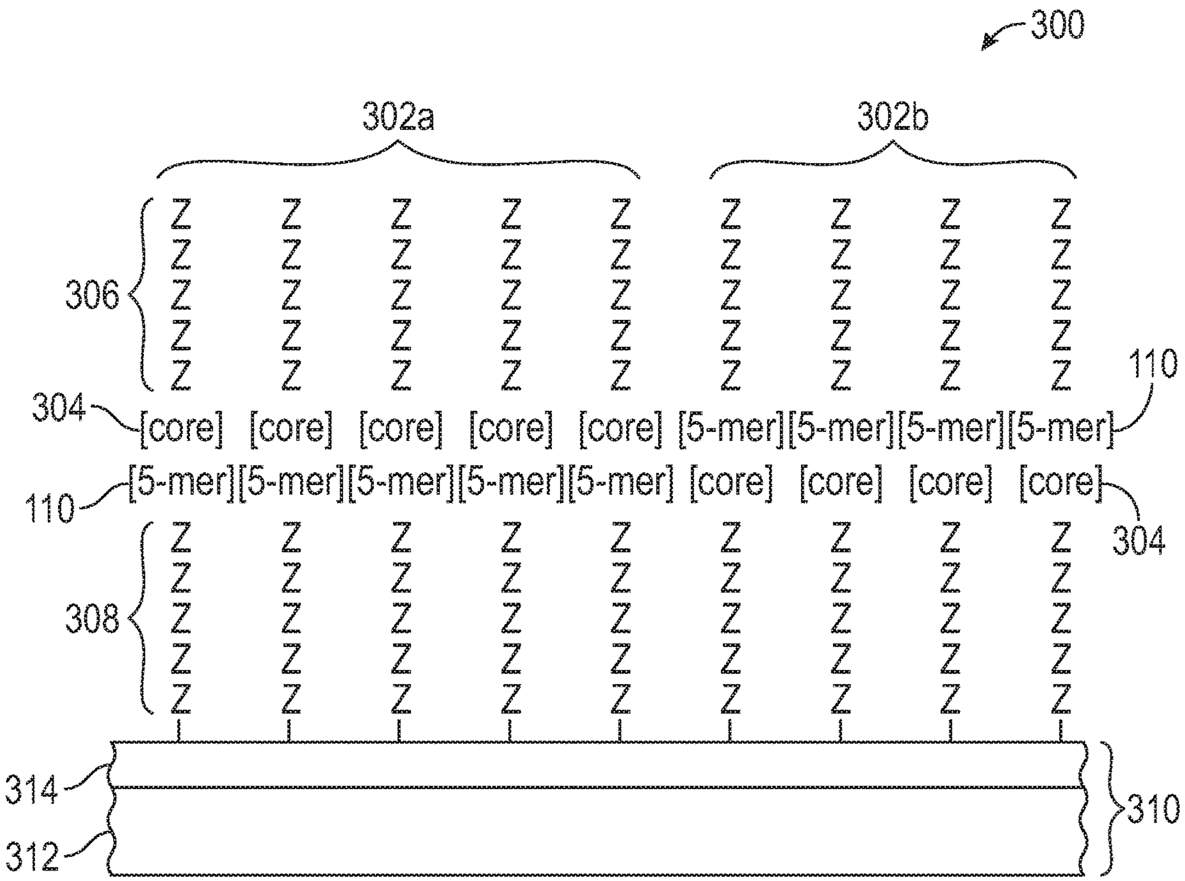
FIG. 3 is a schematic illustration of an embodiment of a maturation array including a population of peptides immobilized on solid support, where each of the peptides includes a matured core hit peptide sequence.

One example of C-terminal extension according to the instant disclosure is illustrated in FIG. 3. A peptide extension or maturation array 300 includes a first population of peptides 302_a_ and a second population of peptides 302_b_. Each of the peptides 302_a_ and the peptides 302_b_ includes a matured core hit peptide 304 identified through the maturation process in the step 204 of the process 200 (FIG. 2). Specific peptide probes selected from the population of probe peptides (e.g., 5-mer probe peptides 110; FIG. 1) from the step 202 of peptide binder discovery is added to (or synthesized onto) the C-terminal end of a matured core hit peptide 304 of the first population of peptides 302_a_. In this manner, the most N-terminal amino acid of each peptide sequence is positioned directly adjacent to the most C-terminal amino acid of the matured core hit peptide 304.

Likewise, according to various embodiments of N-terminal extension of the instant disclosure, and with reference to FIG. 3, once the sequence of the matured core hit peptide 304 is identified through the maturation process (step 204; FIG. 2), each specific one of the 5-mer probe peptides 110 of the population 102 from the step 202 of peptide binder discovery (5-mer probe peptides 110, FIG. 1) is added to the N-terminal end of the matured core hit peptides 304 in the second population of peptides 302_b_. In this manner, the most C-terminal amino acid of each peptide sequence (5-mer probe peptides 110; FIG. 1) is added directly adjacent to the most N-terminal amino acid of the matured core hit peptide 304.

According to some embodiments of the instant disclosure (FIG. 3) one or both of the matured core hit peptides 304 used in C-terminal extension and N-terminal extension may also include either or both of an N-terminal wobble sequence (N-term 306) and a C-terminal wobble sequence (C-term 308). As with the N-term 106 and the C-term 108 in FIG. 1, the N-term 306 and C-term 308 may comprise as few as one amino acid or as many as fifteen to twenty amino acids (or more), and the N-term 306 may be the same length as, longer than, or shorter than the C-term 308. Further, the N-term 306 and C-term 308 can be added by using different mixtures of amino acids during the maturation process. Any single amino acid can be used or any "wobble mix" consisting of two or more amino acids. In yet other embodiments, a "flexible wobble mix" is used consisting of a mixture of Gly and Ser at a ratio 3:1 (Gly:Ser). In other embodiments, a "random wobble mix" is used consisting of a random mixture of all twenty amino acids. In some embodiments, non-natural amino acids (e.g., 6-aminohexanoic acid) can also be used. Some embodiments may include non-amino acid moieties (e.g., polyethylene glycol).

In FIG. 3, a peptide maturation array 300 is shown, having a population of peptides for C-terminal extension 302_a_ and a population of peptides for N-terminal extension 302_b_. In the illustrated embodiment, the peptide maturation array 300 includes an array substrate 310 comprising a solid support 312 having a reactive surface 314 (e.g., a reactive amine layer for example) with the first population of peptides 302_a_ and the second population of peptides 302_b_ immobilized thereto. Each of the first population of peptides 302_a_ and the second population of peptides 302_b_ can include the full complement of 5-mer probe peptides 110 from peptide array 100 (e.g., used in the step 204 of peptide binder discovery). As further illustrated, each peptide of both the first population of peptides 302_a_ and the second population of peptides 302_b_ can include the same matured core hit peptide 304, each with a different 5-mer probe peptide 110 (of the population of 5-mer probe peptides 110 from the peptide binder discovery step 102, FIG. 1). Also as shown in FIG. 3, each peptide of the first population of peptides 302_a_ and the second population of peptides **302*b* includes wobble amino acid sequences at the N-term 306 and the C-term 308**.

In some embodiments, the maturation array 300 (including peptides **302*a* and peptides 302*b*) is exposed to a concentrated, purified protein of interest or another like receptor (as in peptide binder discovery; the step 202 of the process 200), whereby the protein may bind any peptide of either of the first population of peptides 302*a* and the second population of peptides 302*b*, independent of the other peptides comprising the first population of peptides 302*a* and the second population of peptides 302*b*. After exposure to the protein of interest, binding of the protein of interest to the peptide of the first population of peptides 302*a* and the second population of peptides 302*b* is assayed, for example, by way of exposing the complex of the individual peptide of the first population of peptides 302*a* and the second population of peptides 302*b* and protein to an antibody (specific for the protein) which has a reportable label (e.g., peroxidase) attached thereto. In another embodiment, the protein of interest may be directly labeled with a reporter molecule. Because the sequence of each of the 5-mer probe peptides 110 for each location on the array is known, it is possible to chart, quantify, compare, contrast, or a combination thereof, the sequences (and binding strengths) of the binding of the protein to the specific probe comprising the matured core hit peptide 304 with the respective one of the 5-mer probe peptides 110**.

An exemplary method of comparing the protein (of interest) binding to the combination of the matured core hit peptide 304 and the 5-mer probe peptide 110 (comprising either of the first population of peptides **302*a* and the second population of peptides 302*b*) is to review the binding strength in a principled analysis distribution-based clustering, such as described by White et al., (Standardizing and Simplifying Analysis of Peptide Library Data, J Chem Inf Model, 2013, 53(2), pp 493-499). As is exemplified herein, clustering of protein binding to the respective probes (of the first population of peptides 302*a* and the second population of peptides 302*b*) shown in a principled analysis distribution-based clustering indicates 5-mer probe peptides 110 having overlapping peptide sequences. As demonstrated in greater detail below, from the overlapping peptide sequences (of each cluster), the sequence of the matured core hit peptide 304 can be identified, or at least hypothesized and constructed for further evaluation. In some embodiments of the instant application, an extended, matured core hit peptide 304 undergoes a maturation process (as described and exemplified herein and illustrated at the step 204 of FIG. 2**).

Additional rounds of optimization of extended peptide binders are also possible. For example, a third round of binder optimization may include extension of the sequences identified in the extension array experiments with Gly amino acid. Other optimization may include creating double substitution or deletion libraries that include all possible single and double substitution or deletion variants of the reference sequence (i.e., the peptide binder optimized and selected in any of the previous steps).

VII. Specificity Analysis of Extended, Matured Core Hit Peptide Binders

Following identification of an extended, matured core hit peptide, a specificity analysis may be performed by any method of measuring peptide affinity and specificity available in the art. One example of a specificity analysis includes a "BIACORE™" system analysis which is used for characterizing molecules in terms of the molecules' interaction specify to a target, the kinetic rates (of "on," binding, and "off," disassociation) and affinity (binding strength). BIACORE™ is a trademark of General Electric Company and is available via the company website.

Figure 4:
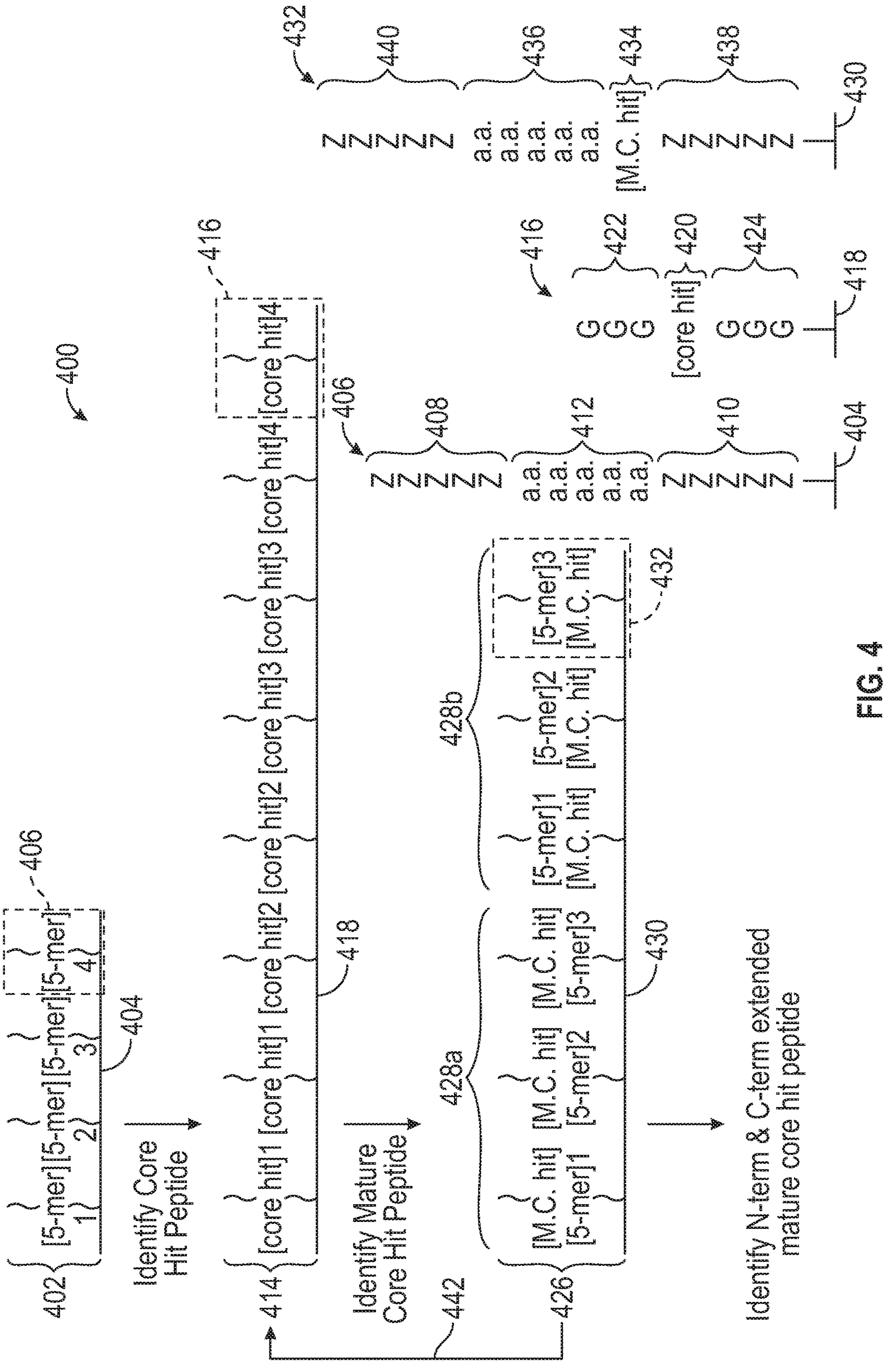
FIG. 4 is a schematic illustration of an embodiment of a method for the identification of peptide binders.

FIG. 4 is a brief schematic overview of a method 400 of novel peptide binder identification (e.g., process 200 of FIG. 2). As shown, an array 402 for peptide binder discovery is prepared by synthesizing (e.g., through maskless array synthesis) a population of peptides on an array substrate 404. As illustrated, each peptide 406 (or peptide feature) in the array 402 includes 5 cycles of wobble synthesis at the N-terminus (N-term 408) and 5 cycles of wobble synthesis at the C-terminus (C-term 410) such that each of the N-term 408 and C-term 410 comprises five amino acids. It should be understood that the wobble synthesis of the N-term 408 and C-term 410 may comprise any composition as noted above. For example, wobble synthesis can comprise only amino acids Gly and Ser, in a 3:1 ratio (Gly:Ser), or a random mixture of all 20 amino acids. Each peptide 406 is also shown as comprising a 5-mer peptide binder or probe peptide 412, which as noted above may comprise up to 2.9 million different peptide sequences such that an entire human proteome is represented. Further, it should be noted that the different probe peptides 412 may be synthesized according to specific "rules." Non-limiting example rules include the exclusion of one or more amino acids (e.g., Cys, Met, or a combination thereof), the exclusion of repeats of the same amino acid in consecutive order, the exclusion of motifs already known to bind the target protein (e.g., His-Pro-Gln amino acid motifs for streptavidin), and combinations thereof. As described above, a protein target of interest (e.g., in purified and concentrated form) is exposed to the 5-mer probe peptides 412, and binding is scored (e.g., by way of a principled clustering analysis), whereby a "core hit peptide" sequence is identified based on overlapping binding motifs.

In some embodiments, upon identification of a core hit peptide sequence, an exhaustive maturation process may be undertaken as illustrated for the maturation or maturation array 414. The maturation array 414 includes a population of peptides 416 that are immobilized to an array substrate 418. In some embodiments, the core hit peptide (exemplified as a 5-mer core hit peptide 420) is synthesized on the array substrate 418 with both an N-terminal wobble sequence (N-term 422) and a C-terminal wobble sequence (C-term 424). In the example illustrated in FIG. 4, each of the peptides 416 includes three cycles of N-terminal and C-terminal wobble synthesis of only the amino acid Gly, although the wobble amino acid may vary as noted above. In some embodiments of exhaustive maturation, a core hit peptide 416 is synthesized on the array substrate 418 wherein every amino acid position of the core hit peptide 416 is substituted with each of the other nineteen amino acids or a double amino acid substitution (as described above) is synthesized on the array substrate 418 or an amino acid deletion scan is synthesized on the array substrate 418, or an amino acid insertion scan is synthesized on the array substrate 418. In some cases, all of the above maturation processes are performed (and optionally repeated as described above for the new peptides generated as a result of the amino acid deletion and insertion scans). Upon synthesis of the maturation array 414 comprising the various peptides (inclusive of the substitutions, deletions and insertions described herein), the target protein is exposed to the modified core hit peptides 420 on the maturation array 414, and strength of binding is assayed, whereby a "matured core hit peptide" sequence is identified.

In further embodiments, after identification of a "matured core hit peptide" sequence, one or both of N-terminal and C-terminal extensions may be performed as illustrated for an extension array 426. The extension array 426 includes a first population of peptides 428*a* and a second population of peptides 428*b* that are each immobilized to an array substrate 430. As illustrated for a selected peptide 432 of the second population of peptides 428*b*, each of the first population of peptides 428*a* and the second population of peptides 428*b* includes a matured core hit peptide 434 (M.C. hit) coupled to an extension sequence 436 at either the N-terminus (in the case of the second population of peptides 428*b*) or the C-terminus (in of the case of first population of peptides 428*a*). N-terminal and C-terminal extensions involve the synthesis of the matured core hit peptides 434 adjacent the population of probe peptides 412 (in this example, 5-mers). The probe peptides 416 are synthesized at either the N-terminus or C-terminus of the matured core hit peptides 434. As shown for the first population of peptides 428*a*, C-terminal extension involves five rounds of wobble synthesis to provide a C-terminal wobble sequence (C-term 438) and the extension sequence 436 being synthesized C-terminally of the matured core hit peptide 434, followed by another 5 cycles of wobble synthesis to provide an N-terminal wobble sequence (N-term 440). Similarly, as shown for the second population of peptides 428*b*, N-terminal extension involves five rounds of wobble synthesis (as described above) yielding the C-term 438, which is synthesized C-terminally of the matured core hit peptide 434, then the extension sequence 436 and another 5 cycles of wobble synthesis to provide the N-term 440. Upon synthesis of the extension array 426 comprising the various C-terminal and N-terminal extension peptides (i.e., the first population of peptides 428*a* and the second population of peptides 428*b*), the target protein is exposed to the extension array 426, and binding is scored (e.g., by way of a principled clustering analysis), whereby a sequence of the C-terminally or N-terminally extended, matured core hit peptide 434 is identified. As represented by the arrow indicated at 442, according to some embodiments, after the extended, matured core hit peptide (e.g., peptide 432) is identified, the maturation process for the extended matured core hit peptide may be repeated and then the extension process may also be repeated for any altered peptide sequence resulting therefrom.

VIII. Identification of Binder Peptides for Specific Targets

According to embodiments of the instant disclosure, peptide microarrays are incubated with samples including the target proteins to yield specific binders for various receptors. Example receptors include streptavidin, Taq polymerase, human proteins such as prostate specific antigen, thrombin, tumor necrosis factor alpha, urokinase-type plasminogen activator, or the like. Methods and example peptide binders for the aforementioned receptors are described by Albert et al. (U.S. Pat. App. No. 2015/0185216 to Albert et al. and U.S. Prov. Pat. App. Ser. No. 62/150,202 to Albert et al.).

While the identified peptide binders may be used for various binder-specific purposes, some uses are common to all binders. For example, for each of the targets described herein, the peptide binders of the present technology may be used as quality control peptides for inclusion in the synthesis of a broader population of peptides (e.g., for use on a peptide array for discovery of new peptide binder sequences).

With reference to FIGS. 6A-6C, a peptide array 600 includes a population of peptide features 602 immobilized on an array substrate 604. Each of the peptide features 602 includes a plurality of colocalized peptides sharing the same amino acid sequence. Depending on the synthesis method employed, a peptide feature may have a varying footprint or feature density. In one example, a peptide feature has a footprint of about 10 μm×10 μm square and includes up to about $10^7$ individual peptides. However, other footprints and feature densities are possible as will be recognized of a person of ordinary skill in the art. In the present example, the peptide feature 606 includes a plurality of peptides that each have the same amino acid sequence. The peptide array 600 further includes a peptide feature 608 having a plurality of peptide sequences that are different from the sequences comprising the peptide feature 606. Notably, the peptide array 600 can include numerous peptide features beyond the number of features shown in the embodiment illustrated in FIG. 5.

Figure 7:
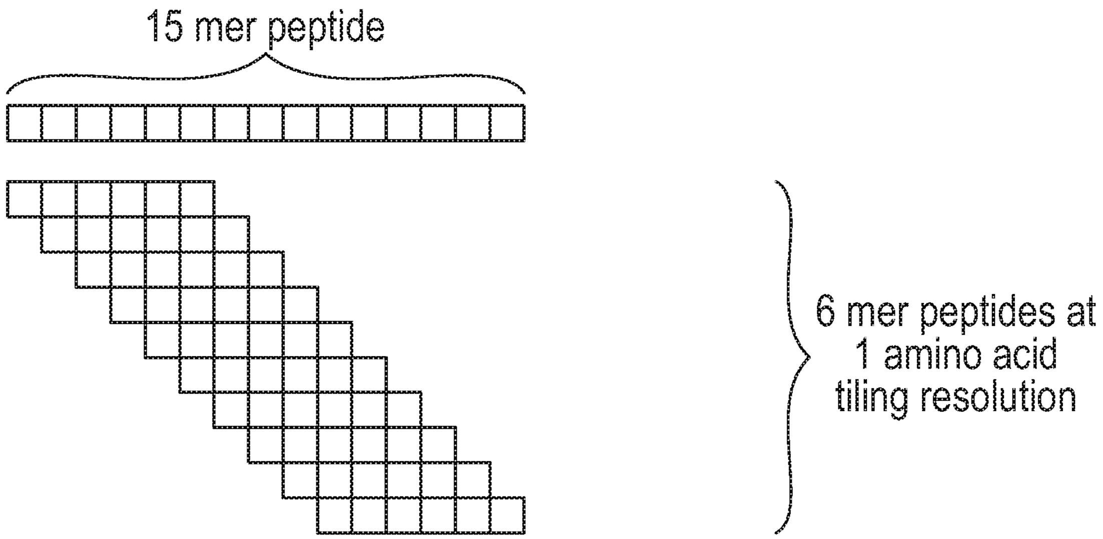
FIG. 7 is a schematic illustration of a 15-mer peptides tiled at 1 amino acid resolution illustrating how a composite 15-mer peptide can represent ten 6-mer elements or subsequences.

In one aspect, the peptide features on a peptide array 600 can collectively define at least one naturally occurring amino acid sequence. For example, the peptides can be tiled at 1 amino acid resolution (see FIG. 6 and FIG. 7) along the length of an entire partial or full length protein sequence of interest. In another example, the peptides can be tiled at 4 amino acid resolution (see FIG. 6) along the length of an entire partial or full length protein sequence of interest. In some embodiments, the peptides can have amino acid sequences that collectively represent the entire human proteome or another proteome of interest. In the present example, the peptide array 600 includes a peptide feature 610, a peptide feature 612, and a peptide feature 614, where each of the peptide feature 610, the peptide feature 612, and the peptide feature 614 includes a plurality of peptides that each have a different amino acid sequence relative to each of the other peptide features.

Figure 5A:
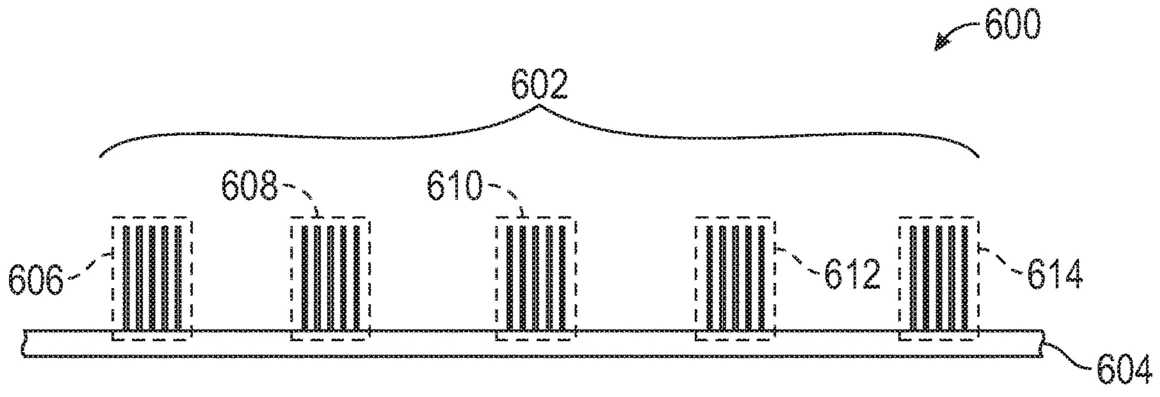
FIG. 5A is a schematic illustration of an embodiment of a peptide array including a population of peptide features for the identification and characterization of control peptides.
Figure 5B:
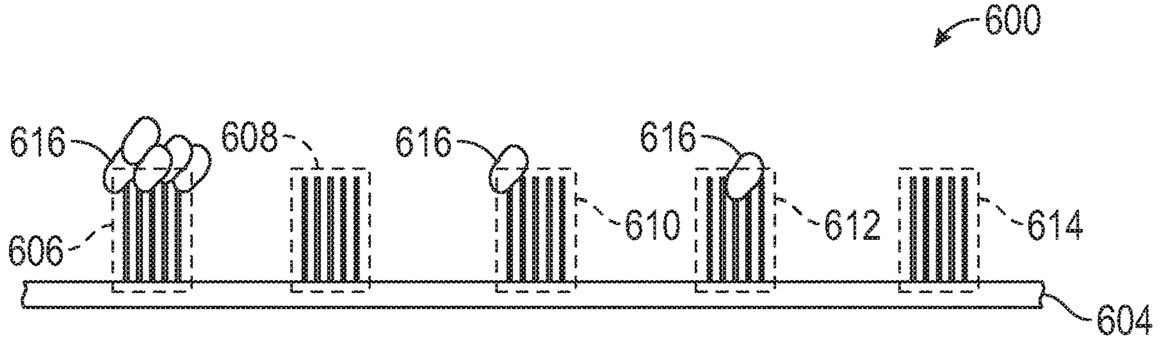
FIG. 5B is a schematic illustration of an embodiment of the peptide array of FIG. 5A following exposure of the peptide features to a plurality of receptor molecules.
Figure 5C:
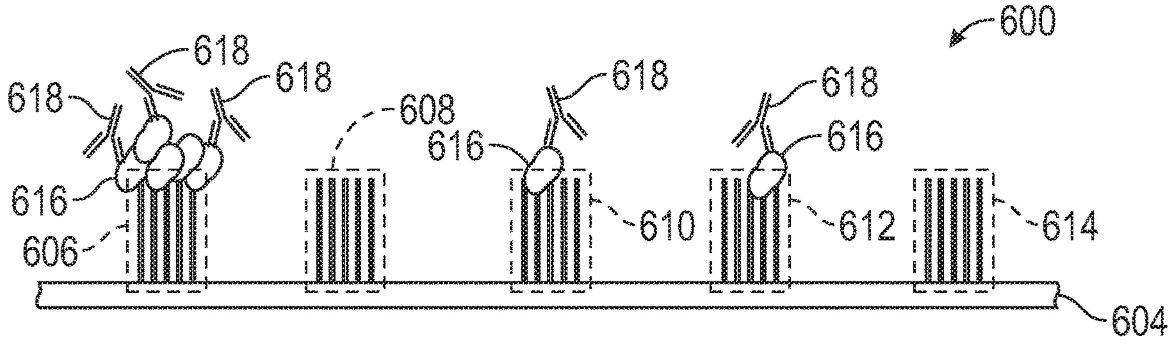
FIG. 5C is a schematic illustration of an embodiment of the peptide array of FIG. 5B following binding of a detectable tag to the receptor molecules.

Once the peptide array 600 has been synthesized as illustrated in FIG. 5A, a plurality of receptor molecules known to interact with the selected peptide binder sequences can be contacted to the peptide array 600 in order to interrogate the population of peptide features 602 in the presence of the receptor molecules (FIG. 5B). A number of receptor molecules 616 are shown as interacting with the peptide feature 606. Interaction of the receptor molecules 616 with the peptide feature 606 can include binding, catalysis of (or participation in) a reaction including peptides within the peptide feature 606, digestion of the peptides within the feature 606, the like, and combinations thereof. In the present example shown in FIGS. 5A-5C, the receptor 616 was used in the identification of the peptide binder sequence represented by the peptides in the feature 606. Accordingly, a strong degree of interaction between the peptides in the peptide feature 606 and the receptor molecules 616 would be anticipated as represented by the plurality of receptor molecules 616 associated with the feature 606. In one aspect, the interaction of the receptor molecules 616 with the population of peptide features 602 on the peptide array 600 can be detected, for example, by labelling the receptor molecules 616 with a detectable tag 618 (FIG. 5C). As shown in the illustrated embodiment, the detectable tag 618 is a labeled antibody that is specific for targeting the receptor molecules 616. However, other detection schemes are within the scope of the present disclosure.

Whereas a plurality of receptor molecules 616 are associated with the feature 606 in FIG. 5B, relatively few or no receptor molecules 616 are associated with any one of the peptide feature 608, the peptide feature 610, the peptide feature 612, and the peptide feature 614. In one aspect, the sequences of the peptides in the peptide feature 608 resulted in little to no interaction of the receptor molecules 616 with the peptide feature 608. In another aspect, the sequences of the peptides in the peptide feature 610, the peptide feature 612, and the peptide feature 614 resulted in little to no interaction of the receptor molecules 616 with the aforementioned peptide features. As a result, a preference of the receptor molecules for the peptide sequence represented in the feature 606 can be inferred. Similarly, the degree of interaction or the relative change in the extent of interaction of the receptor molecules 616 with any of the peptide features on the peptide array 600 can be interrogated.

The examples herein are provided to illustrate advantages of the present technology and to further assist a person of ordinary skill in the art with preparing or using the compounds of the present technology or salts, pharmaceutical compositions, derivatives, solvates, metabolites, prodrugs, racemic mixtures or tautomeric forms thereof. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

EXAMPLES

Example 1: Naive Discovery of Novel DsbA-Binding Peptides

Novel DsbA-binding peptides were discovered using an enhanced and improved peptide library, as described previously. Briefly, the peptide array was synthesized by light-directed array synthesis in a Roche NimbleGen Maskless Array Synthesizer (MAS) using an amino-functionalized substrate as previously reported (Forsström, et al., "Proteome-wide Epitope Mapping of Antibodies Using Ultra-dense Peptide Arrays," Molecular & Cellular Proteomics 13:1585-1597 (2014) and Lyamichev, et al., "Stepwise Evolution Improves Identification of Diverse Peptides Binding to a Protein Target," Nature Scientific Reports 7:12116 (2017), both of which are incorporated herein by reference in their entireties). L-amino acids were synthesized by Orgentis Chemicals GmbH. Custom amino acids were purchased from Lifetein. Cy5™-streptavidin was purchased from GE Healthcare, Blocker™ BSA (10%) in PBS from ThermoFisher, and SecureSeal™ hybridization chambers from Grace Bio-Labs. Final side chain deprotection was performed by incubating the microarray in 60 mM EDT and 25 mM TIPS in 95% TFA (v/v) for 30 min at room temperature. The microarray was then washed twice in methanol for 30 seconds, once in 1×TBST for 1 min, twice in TBS for 30 seconds, and then spun dry in a microcentrifuge equipped with an array holder. To determine which of these peptides were able to bind to DsbA, and to what extent, DsbA was incubated on the array. Here, 2.6 μL biotin-labeled DsbA (1.5 mg/mL, abcam) was incubated on the array in 49 μL binding buffer containing 100 mM HEPES (pH 7.3), 1% BSA, 250 mM NaCl, 20 mM L-glutathione-reduced, and 0.2 mM L-glutathione-oxidized in a hybridization chamber overnight at 4° C. After incubation, arrays were washed in water for 15 seconds placed directly into a streptavidin-Cy5 detection bath. Positive binding to DsbA was determined by the detection of Streptavidin-Cy5. Streptavidin-Cy5 binding to all arrays was performed with 20 μL streptavidin-Cy5 (1 μg/mL) in 30 mL binding buffer containing 10 mM Tris-HCl (pH 7.4), 1% Casein, 0.05% Tween-20 in a 30 mL pap jar for 1 hour at room temperature. After incubation, arrays were washed in 20 mM Tris-HCl (pH 7.8), 0.2 M NaCl, 1% SDS for 30 seconds followed by a 30 seconds wash in water. The arrays were then dried by spinning in a microcentrifuge equipped with an array holder. Data was analyzed by measuring Cy5 fluorescence intensity of the arrays and extracting data, as previously described in Lyamichev, et al. (2017).

To generate the improved and unique peptide array library, two peptide libraries of approximately 3 million unique 15-mer linear peptides were synthesized. One library contained peptides that can be found in the human proteome, the other contained any 15-mer peptide consisting of L amino acids. To narrow the number of possible 15-mer peptides in both libraries down to approximately 3 million peptides, a calculation was run to select for the maximum diversity of 6mer peptide sequences. Each 15-mer sequence was replicated two times. Table 3 shows the peptide sequences of the 20 best DsbA-binding peptides discovered from two unique 15-mer peptide libraries, human and non-human, that bind to and interact specifically with biotin-labeled DsbA.

TABLE 3

20 best DsbA-binding peptides discovered from two unique 15-mer peptide libraries

| PEPTIDE ID | PEPTIDE SEQUENCE | SEQ ID NO: |
|---|---|---|
| DsbA_1_WT | DFWHGDTCKVTQFDQ | 70 |
| DsbA_2_WT | NDYQYKGQQCWDPRY | 31 |
| DsbA_42_WT | HNWAAQCTNPDQAKL | 32 |
| DsbA_48_WT | WSLGQCVADQPNQTW | 33 |
| DsbA_50_WT | SIIGQCYSKDPSQAT | 34 |
| DsbA_61_WT | QNFYGETRFTPISSW | 35 |
| DsbA_71_WT | LSYNLFYGKCWAPWF | 36 |
| DsbA_91_WT | CQNPAYQKKYNWEPV | 37 |
| DsbA_92_WT | IWLGECCKNNYSRAR | 38 |
| DsbA_94_WT | VIVGQCLKKYNDTRV | 39 |
| DsbA_97_WT | KPIYLGQCCNTSHAR | 40 |
| DsbA_98_WT | RSNNDICFWTGQQCC | 41 |
| DsbA_129_WT | YVYGTCWKDYTDTDK | 42 |
| DsbA_131_WT | QIGQCLKNVGYREVP | 43 |
| DsbA_132_WT | FQVGQCINVQYDTNP | 44 |
| DsbA_134_WT | KPNVDFWHGGQCNFT | 45 |
| DsbA_135_WT | FQIGQCYGTQHWASF | 46 |
| DsbA_137_WT | WQYENWAITKWQCVT | 47 |
| DsbA_138_WT | SDGWAKQCWAPTHNT | 48 |
| DsbA_154_WT | GQDWHGQQCCAEYAE | 49 |

TABLE 3-continued

| 20 best DsbA-binding peptides discovered from two unique 15-mer peptide libraries | | |
|---|---|---|
| PEPTIDE ID | PEPTIDE SEQUENCE | SEQ ID NO: |
| DsbA_156_WT | IPHQYAPGQCCKIAY | 50 |
| DsbA_160_WT | TLGQCCAFPVLDWKN | 51 |
| DsbA_167_WT | ALGECVKPLAFEKQS | 52 |
| DsbA_170_WT | VIGFCAKPQDNSSAP | 53 |

The peptide sequences shown in Table 3 represent peptides that bind to DsbA with high affinity and specificity. By way of example, FIG. 8 shows the Cy5 fluorescence intensity of the array for DsbA-binding peptide having sequence DFWHGDTCKVTQFDQ (SEQ ID NO: 70). Data was analyzed and extracted for all other DsbA-binding peptides from Table 3 (data not shown), but only DFWHGDTCKVTQFDQ (SEQ ID NO: 70) is shown here. FIG. 8 shows the single substitution plot for the DFWHGDTCKVTQFDQ peptide, DsbA_1_WT (SEQ ID NO: 70). Each peptide position is represented by 21 bars (one bar for each of the 20 amino acids and one bar for deletion). The height of each bar indicates the median signal intensity.

Example 2: Validation of Discovered and Incrementally Optimized Novel DsbA-Binding Peptides by Kinetic Characterization Studies The discovered and incrementally optimized novel DsbA-binding peptides were subject to kinetic characterization. Kinetic analysis of the interaction between the discovered peptides and DsbA was performed using a Biacore XI00. Biotin-labeled DsbA (1 uM) was immobilized on streptavidin coated chip (GE Healthcare) to a target level of 1,000 response units in HBS-P+. Typical immobilization levels was 1,400. Fourteen dilutions of peptide from 5000 nM to 0.6 nM in HBS-P+ were flowed over the DsbA coated chip in triplicate with a contact time of 120 seconds and a dissociation time of 600 seconds. Table 4 shows the kinetic parameters for the binding of discovered peptides to immobilized biotin-labeled DsbA on a Biacore XI00. All peptides were amidated on the C-terminus.

TABLE 4

| Kinetic parameters for the binding of discovered peptides to immobilized biotin labeled DsbA on a Biocore XI 00 | | | | | |
|---|---|---|---|---|---|
| PEPTIDE SEQUENCE | SEQ ID NO: | SIGNAL INTENSITY | KoN | KoFF | KD (nM) |
| PSPWATCDF-$NH_2$ | 54 | 82 | | | 2900 |
| PSPFATCDF-$NH_2$ | 55 | 75 | | | 4000 |
| DFWHGDTCKVTQFDQ-$NH_2$ | 70 | 1750 | 130000 | 0.02708 | 208 |
| DFWHGETCKVTQFDQ-$NH_2$ | 56 | 1801 | 219500 | 0.01848 | 84 |
| DFWHGEQCKVTQFDQ-$NH_2$ | 57 | 4590 | 258700 | 0.01392 | 53 |
| NDYQYKGQQCLDPKY-$NH_2$ | 58 | 3623 | 514600 | 0.02464 | 48 |
| HNWAAQCLNPDQAKL-$NH_2$ | 59 | 2640 | 509600 | 0.02921 | 57 |
| HNWAAQCLKDQAKL-$NH_2$ | 60 | 1759 | 509300 | 0.04478 | 88 |
| SIIGQCYKKDPSQAT-$NH_2$ | 61 | | | | 553 |
| SIIGMCYKKDPS-$NH_2$ | 62 | 1365 | | | 188 |
| VIGQCLKN-$NH_2$ | 63 | 588 | | | 623 |
| WQYENWAITKWQCVK-$NH_2$ | 64 | 1427 | | | 83 |
| VIVGQCLKK-$NH_2$ | 65 | 282 | | | 622 |
| VILGQCLKQ-$NH_2$ | 66 | 965 | | | 517 |
| YVYGMCWKDYTDTDK-$NH_2$ | 67 | 2114 | 538200 | 0.06268 | 116 |
| YVYGMCWKDYTTDK-$NH_2$ | 68 | 2297 | 728500 | 0.05703 | 78 |

Figure 9:
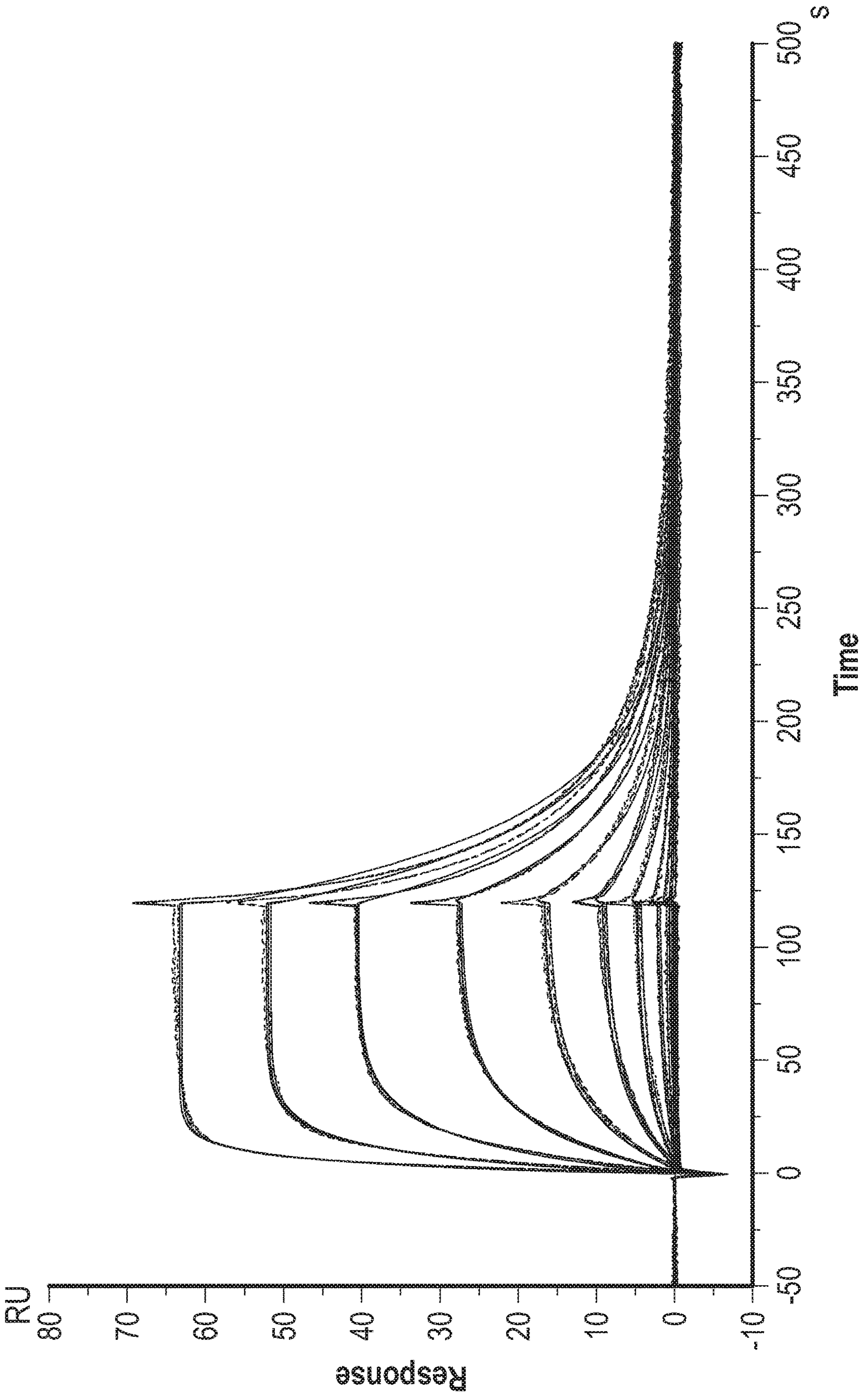
FIG. 9 shows the binding of DsbA_1_WT, DFWHGDTCKVTQFDQ-NH2 (SEQ ID NO: 70), to biotin-labeled DsbA immobilized on a (Biacore) SA Chip.

FIG. 9 shows the binding of DsbA_1_WT, DFWHGDTCKVTQFDQ-NH2 (SEQ ID NO: 70), to biotin-labeled DsbA immobilized on a (Biacore) SA Chip. Concentration of peptide ranges from 1.2 nM to 1250 nM.

Figure 10:
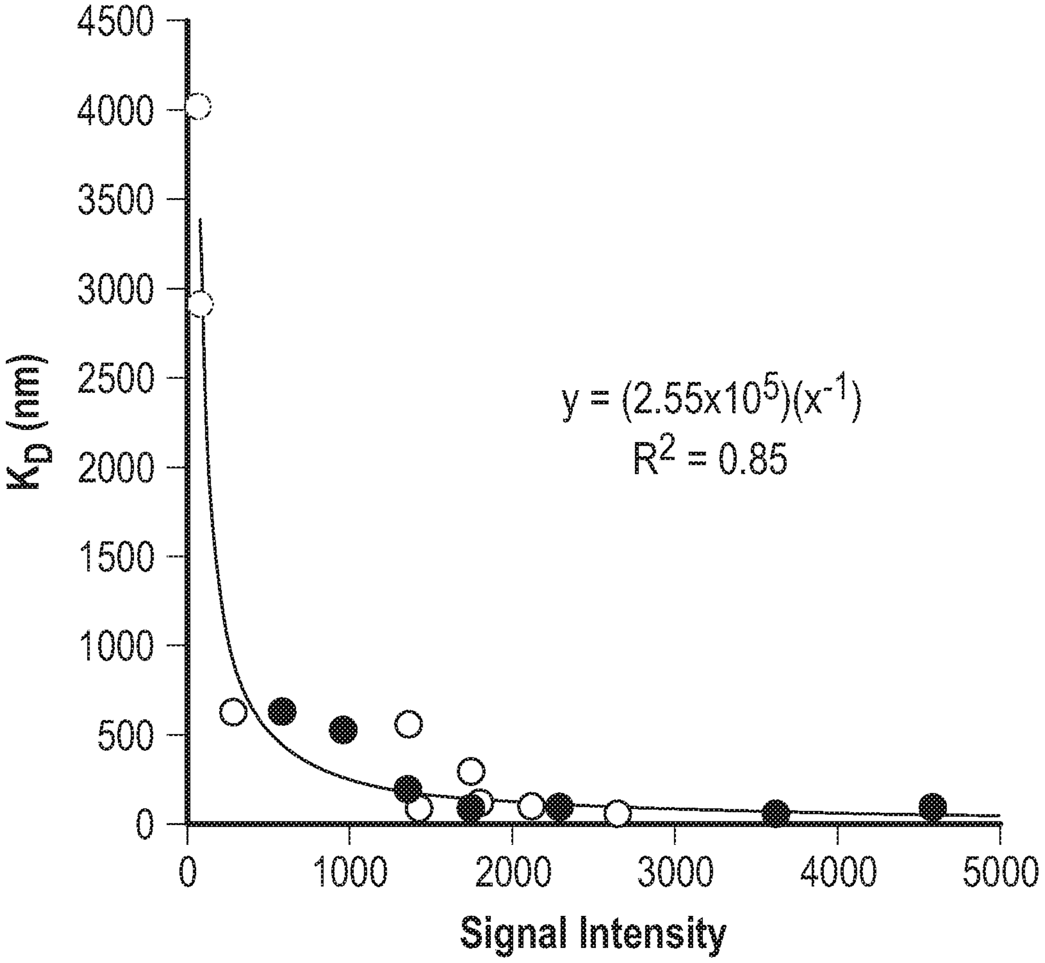
FIG. 10 shows a comparison of fluorescent signal intensity and binding affinity.

FIG. 10 shows a comparison of fluorescent signal intensity and binding affinity. Fluorescent signal intensity was measured by peptide microarray and the KD values were determined by Biacore or ITC (see, Duprez, et al. (2015)). Values for the graph can be found in Table 10, above. Peptides tested via Biacore were amidated on the C-terminus.

Taken together, this data shows that the peptides that were discovered and incrementally optimized bind with high affinity and specificity to DsbA.

EQUIVALENTS

The schematic flow charts shown in the Figures are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed in the Figures are provided to explain the logical steps of the method and are understood not to limit the scope of the method. Although various arrow types and line types may be employed, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention. Accordingly, the foregoing description is meant to be exemplary, and does not limit the scope of present inventive concepts.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A method for identifying a peptide binder, the method comprising:

contacting a first sample with an engineered peptide library;

selecting at least one of the plurality of peptides from the first subset of peptides;

detecting a first signal output characteristic of an interaction of the sample with the engineered peptide library; and selecting the at least one peptide, which binds to the sample, based on the first signal output;

wherein the engineered peptide library comprises:

a plurality of peptide features, each of the peptide features including at least one peptide, the at least one peptide comprising a composite region having a defined sequence of amino acids of length N, the composite region representing k different elements, each of the different elements having defined sequence of amino acids of length x; wherein x, N and k are integers, x is less than N, k is at least 2 and is defined by the equation, k=N−x+1, a total number of different elements represented by the engineered peptide library is $K_{Eng}$, the number of peptide features included in the engineered peptide library is F, and $K_{Eng}$ is at least 0.8*k*F.

2. The method of claim 1, wherein the first signal output is a fluorescence intensity obtained through fluorophore excitation-emission, the fluorescence intensity reflecting at least one of:

i) an abundance of a component of one of the first sample and a second sample associated with the first plurality of peptides, and ii) a binding affinity of the component of one of the first sample and a second sample to the first plurality of peptides.

3. The method of claim 1, wherein the first sample comprises a receptor, antibody, enzyme, peptide, or an oligonucleotide.

4. The method of claim 1, wherein $K_{Eng}$ is at least 0.9*k*F.

5. The method of claim 1, wherein $K_{Eng}$ is at least 0.95*k*F.

6. The method of claim 1, wherein $K_{Eng}$ is at least 0.99*k*F.

7. The method of claim 1, wherein $K_{Eng}$ is at least 10*F.

8. The method of claim 1, wherein $K_{Eng}$ is at least 20*F.

9. The method of claim 1, wherein each of the elements in a selected one of the composite regions overlaps with each adjacent element in the composite region by at least 1 amino acid.

10. The method of claim 1, wherein the plurality of peptides represents at least 90% of a human proteome.

11. The method of claim 1, wherein N is at least 7 amino acids.

12. The method of claim 1, wherein N is at least 10 amino acids.

13. The method of claim 1, wherein N is at least 15 amino acids.

14. The method of claim 1, wherein x is at least 5 or at least 6.

* * * * *

SEQUENCE LISTING

<160> NUMBER OF SEQ ID NOS: 80

<210> SEQ ID NO 1
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 1

Trp Ser His Pro Gln Phe Glu Lys
1               5

<210> SEQ ID NO 2
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic 6xHis tag"

<400> SEQUENCE: 2

His His His His His His
1               5

<210> SEQ ID NO 3
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 3

Met Met Met Met Met
1               5

<210> SEQ ID NO 4
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 4

Ala Met Met Met Met
1               5

<210> SEQ ID NO 5
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 5

Pro Met Met Met Met
1               5

<210> SEQ ID NO 6

```
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Val Met Met Met Met
1               5


<210> SEQ ID NO 7
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 7

Gln Met Met Met Met
1               5


<210> SEQ ID NO 8
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 8

Met Ala Met Met Met
1               5


<210> SEQ ID NO 9
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 9

Met Gln Met Met Met
1               5


<210> SEQ ID NO 10
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 10

Met Pro Met Met Met
1               5


<210> SEQ ID NO 11
<211> LENGTH: 5
<212> TYPE: PRT
<213> ORGANISM: Artificial Sequence
<220> FEATURE:
```

<221> NAME/KEY: source
<223> OTHER INFORMATION: /note="Description of Artificial Sequence:
Synthetic peptide"

<400> SEQUENCE: 11

Met Asn Met Met Met
1 5

<210> SEQ ID NO 12
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 12

Pro Ala Met Met Met
1 5

<210> SEQ ID NO 13
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 13

Pro Phe Met Met Met
1 5

<210> SEQ ID NO 14
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 14

Pro Val Met Met Met
1 5

<210> SEQ ID NO 15
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 15

Pro Glu Met Met Met
1 5

<210> SEQ ID NO 16
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 16

Val Ala Met Met Met
1 5

<210> SEQ ID NO 17
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 17

Val Phe Met Met Met
1 5

<210> SEQ ID NO 18
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 18

Val Val Met Met Met
1 5

<210> SEQ ID NO 19
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 19

Val Glu Met Met Met
1 5

<210> SEQ ID NO 20
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 20

Ala Ala Met Met Met
1 5

<210> SEQ ID NO 21
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 21

Ala Phe Met Met Met
1 5

<210> SEQ ID NO 22
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Ala Val Met Met Met
1               5

<210> SEQ ID NO 23
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Ala Glu Met Met Met
1               5

<210> SEQ ID NO 24
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Met Met Met Met
1

<210> SEQ ID NO 25
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (1)..(1)
<223> OTHER INFORMATION: Any of the 20 natural amino acids

<400> SEQUENCE: 25

Xaa Met Met Met Met Met
1               5

<210> SEQ ID NO 26
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (2)..(2)
<223> OTHER INFORMATION: Any of the 20 natural amino acids

<400> SEQUENCE: 26

Met Xaa Met Met Met Met
1 5

<210> SEQ ID NO 27
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"
<220> FEATURE:
<221> NAME/KEY: MOD_RES
<222> LOCATION: (3)..(3)
<223> OTHER INFORMATION: Any of the 20 natural amino acids

<400> SEQUENCE: 27

Met Met Xaa Met Met Met
1 5

<210> SEQ ID NO 28
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"
<220> FEATURE:
<221> NAME/KEY: MOD_RES
<222> LOCATION: (4)..(4)
<223> OTHER INFORMATION: Any of the 20 natural amino acids

<400> SEQUENCE: 28

Met Met Met Xaa Met Met
1 5

<210> SEQ ID NO 29
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"
<220> FEATURE:
<221> NAME/KEY: MOD_RES
<222> LOCATION: (5)..(5)
<223> OTHER INFORMATION: Any of the 20 natural amino acids

<400> SEQUENCE: 29

Met Met Met Met Xaa Met
1 5

<210> SEQ ID NO 30
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"
<220> FEATURE:
<221> NAME/KEY: MOD_RES
<222> LOCATION: (6)..(6)
<223> OTHER INFORMATION: Any of the 20 natural amino acids

<400> SEQUENCE: 30

Met Met Met Met Met Xaa 1 5

<210> SEQ ID NO 31
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 31

Asn Asp Tyr Gln Tyr Lys Gly Gln Gln Cys Trp Asp Pro Arg Tyr
1 5 10 15

<210> SEQ ID NO 32
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 32

His Asn Trp Ala Ala Gln Cys Thr Asn Pro Asp Gln Ala Lys Leu
1 5 10 15

<210> SEQ ID NO 33
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 33

Trp Ser Leu Gly Gln Cys Val Ala Asp Gln Pro Asn Gln Thr Trp
1 5 10 15

<210> SEQ ID NO 34
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 34

Ser Ile Ile Gly Gln Cys Tyr Ser Lys Asp Pro Ser Gln Ala Thr
1 5 10 15

<210> SEQ ID NO 35
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 35

Gln Asn Phe Tyr Gly Glu Thr Arg Phe Thr Pro Ile Ser Ser Trp
1 5 10 15

<210> SEQ ID NO 36

<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 36

Leu Ser Tyr Asn Leu Phe Tyr Gly Lys Cys Trp Ala Pro Trp Phe
1 5 10 15

<210> SEQ ID NO 37
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 37

Cys Gln Asn Pro Ala Tyr Gln Lys Lys Tyr Asn Trp Glu Pro Val
1 5 10 15

<210> SEQ ID NO 38
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 38

Ile Trp Leu Gly Glu Cys Cys Lys Asn Asn Tyr Ser Arg Ala Arg
1 5 10 15

<210> SEQ ID NO 39
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 39

Val Ile Val Gly Gln Cys Leu Lys Lys Tyr Asn Asp Thr Arg Val
1 5 10 15

<210> SEQ ID NO 40
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 40

Lys Pro Ile Tyr Leu Gly Gln Cys Cys Asn Thr Ser His Ala Arg
1 5 10 15

<210> SEQ ID NO 41
<211> LENGTH: 15
<212> TYPE: PRT
<213> ORGANISM: Artificial Sequence
<220> FEATURE:

<221> NAME/KEY: source
<223> OTHER INFORMATION: /note="Description of Artificial Sequence: Synthetic peptide"

<400> SEQUENCE: 41

Arg Ser Asn Asn Asp Ile Cys Phe Trp Thr Gly Gln Gln Cys Cys
1 5 10 15

<210> SEQ ID NO 42
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 42

Tyr Val Tyr Gly Thr Cys Trp Lys Asp Tyr Thr Asp Thr Asp Lys
1 5 10 15

<210> SEQ ID NO 43
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 43

Gln Ile Gly Gln Cys Leu Lys Asn Val Gly Tyr Arg Glu Val Pro
1 5 10 15

<210> SEQ ID NO 44
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 44

Phe Gln Val Gly Gln Cys Ile Asn Val Gln Tyr Asp Thr Asn Pro
1 5 10 15

<210> SEQ ID NO 45
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 45

Lys Pro Asn Val Asp Phe Trp His Gly Gly Gln Cys Asn Phe Thr
1 5 10 15

<210> SEQ ID NO 46
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 46

Phe Gln Ile Gly Gln Cys Tyr Gly Thr Gln His Trp Ala Ser Phe
1 5 10 15

<210> SEQ ID NO 47
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 47

Trp Gln Tyr Glu Asn Trp Ala Ile Thr Lys Trp Gln Cys Val Thr
1 5 10 15

<210> SEQ ID NO 48
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 48

Ser Asp Gly Trp Ala Lys Gln Cys Trp Ala Pro Thr His Asn Thr
1 5 10 15

<210> SEQ ID NO 49
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 49

Gly Gln Asp Trp His Gly Gln Gln Cys Cys Ala Glu Tyr Ala Glu
1 5 10 15

<210> SEQ ID NO 50
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 50

Ile Pro His Gln Tyr Ala Pro Gly Gln Cys Cys Lys Ile Ala Tyr
1 5 10 15

<210> SEQ ID NO 51
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 51

Thr Leu Gly Gln Cys Cys Ala Phe Pro Val Leu Asp Trp Lys Asn
1 5 10 15

<210> SEQ ID NO 52
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 52

Ala Leu Gly Glu Cys Val Lys Pro Leu Ala Phe Glu Lys Gln Ser
1               5                   10                  15

<210> SEQ ID NO 53
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 53

Val Ile Gly Phe Cys Ala Lys Pro Gln Asp Asn Ser Ser Ala Pro
1               5                   10                  15

<210> SEQ ID NO 54
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 54

Pro Ser Pro Trp Ala Thr Cys Asp Phe
1               5

<210> SEQ ID NO 55
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 55

Pro Ser Pro Phe Ala Thr Cys Asp Phe
1               5

<210> SEQ ID NO 56
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 56

Asp Phe Trp His Gly Glu Thr Cys Lys Val Thr Gln Phe Asp Gln
1               5                   10                  15

<210> SEQ ID NO 57
<211> LENGTH: 15

<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 57

Asp Phe Trp His Gly Glu Gln Cys Lys Val Thr Gln Phe Asp Gln
1 5 10 15

<210> SEQ ID NO 58
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 58

Asn Asp Tyr Gln Tyr Lys Gly Gln Gln Cys Leu Asp Pro Lys Tyr
1 5 10 15

<210> SEQ ID NO 59
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 59

His Asn Trp Ala Ala Gln Cys Leu Asn Pro Asp Gln Ala Lys Leu
1 5 10 15

<210> SEQ ID NO 60
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 60

His Asn Trp Ala Ala Gln Cys Leu Lys Asp Gln Ala Lys Leu
1 5 10

<210> SEQ ID NO 61
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 61

Ser Ile Ile Gly Gln Cys Tyr Lys Lys Asp Pro Ser Gln Ala Thr
1 5 10 15

<210> SEQ ID NO 62
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 62

Ser Ile Ile Gly Met Cys Tyr Lys Lys Asp Pro Ser
1 5 10

<210> SEQ ID NO 63
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 63

Val Ile Gly Gln Cys Leu Lys Asn
1 5

<210> SEQ ID NO 64
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 64

Trp Gln Tyr Glu Asn Trp Ala Ile Thr Lys Trp Gln Cys Val Lys
1 5 10 15

<210> SEQ ID NO 65
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 65

Val Ile Val Gly Gln Cys Leu Lys Lys
1 5

<210> SEQ ID NO 66
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 66

Val Ile Leu Gly Gln Cys Leu Lys Gln
1 5

<210> SEQ ID NO 67
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic peptide"

<400> SEQUENCE: 67

Tyr Val Tyr Gly Met Cys Trp Lys Asp Tyr Thr Asp Thr Asp Lys
1 5 10 15

<210> SEQ ID NO 68
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 68

Tyr Val Tyr Gly Met Cys Trp Lys Asp Tyr Thr Thr Asp Lys
1 5 10

<210> SEQ ID NO 69
<211> LENGTH: 25
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 69

Glu Gly Val Lys Leu Thr Ala Leu Asn Asp Ser Ser Leu Asp Leu Ser
1 5 10 15

Met Asp Ser Asp Asn Ser Met Ser Val
20 25

<210> SEQ ID NO 70
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 70

Asp Phe Trp His Gly Asp Thr Cys Lys Val Thr Gln Phe Asp Gln
1 5 10 15

<210> SEQ ID NO 71
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 71

Glu Gly Val Lys Leu Thr Ala Leu Asn Asp Ser Ser Leu Asp Leu Ser
1 5 10 15

<210> SEQ ID NO 72
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 72

```
Gly Val Lys Leu Thr Ala Leu Asn Asp Ser Ser Leu Asp Leu Ser Met
1               5                   10                  15


<210> SEQ ID NO 73
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Val Lys Leu Thr Ala Leu Asn Asp Ser Ser Leu Asp Leu Ser Met Asp
1               5                   10                  15


<210> SEQ ID NO 74
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Lys Leu Thr Ala Leu Asn Asp Ser Ser Leu Asp Leu Ser Met Asp Ser
1               5                   10                  15


<210> SEQ ID NO 75
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Leu Thr Ala Leu Asn Asp Ser Ser Leu Asp Leu Ser Met Asp Ser Asp
1               5                   10                  15


<210> SEQ ID NO 76
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Thr Ala Leu Asn Asp Ser Ser Leu Asp Leu Ser Met Asp Ser Asp Asn
1               5                   10                  15


<210> SEQ ID NO 77
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Ala Leu Asn Asp Ser Ser Leu Asp Leu Ser Met Asp Ser Asp Asn Ser
1               5                   10                  15
```

-continued

```
<210> SEQ ID NO 78
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 78

Leu Asn Asp Ser Ser Leu Asp Leu Ser Met Asp Ser Asp Asn Ser Met
1               5                   10                  15


<210> SEQ ID NO 79
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 79

Asn Asp Ser Ser Leu Asp Leu Ser Met Asp Ser Asp Asn Ser Met Ser
1               5                   10                  15


<210> SEQ ID NO 80
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 80

Asp Ser Ser Leu Asp Leu Ser Met Asp Ser Asp Asn Ser Met Ser Val
1               5                   10                  15
```